(12) United States Patent
Adolphe et al.

(10) Patent No.: US 12,452,301 B2
(45) Date of Patent: Oct. 21, 2025

(54) METHODS, SYSTEMS, APPARATUSES, AND DEVICES FOR FACILITATING ATTACK-RESILIENT COMMUNICATIONS BETWEEN DEVICES

(71) Applicant: Forward Edge-AI, Inc., San Antonio, TX (US)

(72) Inventors: Eric Adolphe, San Antonio, TX (US); Benjamin David Tullis, Aurora, IL (US)

(73) Assignee: Forward Edge-AI, Inc., San Antonio, TX (US)

( * ) Notice: Subject to any disclaimer, the term of this patent is extended or adjusted under 35 U.S.C. 154(b) by 304 days.

(21) Appl. No.: 18/345,080

(22) Filed: Jun. 30, 2023

(65) Prior Publication Data

US 2025/0007947 A1    Jan. 2, 2025

(51) Int. Cl.
*H04L 9/40*    (2022.01)
(52) U.S. Cl.
CPC ...... *H04L 63/1466* (2013.01); *H04L 63/0407* (2013.01); *H04L 63/0428* (2013.01); *H04L 63/0435* (2013.01)
(58) Field of Classification Search
CPC ............... G06F 21/602; H04L 63/0428; H04L 63/0471; H04L 63/0485
See application file for complete search history.

(56) References Cited

U.S. PATENT DOCUMENTS

| | | | |
|---|---|---|---|
| 11,588,789 B2 | 2/2023 | Kerseboom et al. | |
| 12,199,958 B1 * | 1/2025 | Layton | H04L 63/0428 |
| 2015/0009991 A1 * | 1/2015 | Sung | H04L 12/4641 |
| | | | 370/392 |

FOREIGN PATENT DOCUMENTS

WO    WO-2017058183 A1 *    4/2017    ............ H04L 41/12

OTHER PUBLICATIONS

C. Hennebert and J. D. Santos, "Security Protocols and Privacy Issues into 6LoWPAN Stack: A Synthesis," in IEEE Internet of Things Journal, vol. 1, No. 5, pp. 384-398, Oct. 2014 (Year: 2014).*

* cited by examiner

*Primary Examiner* — Zhimei Zhu

(57) ABSTRACT

A system facilitating attack-resilient communications between devices. The system comprises a master system comprising a master network switch and master encryption retransmission devices. The master encryption retransmission devices comprises a master encryption unit and a master communication unit communicatively coupled with the master encryption unit. The master system is configurable for connecting with a slave system comprising a slave network switch and slave encryption retransmission devices connected with the slave network switch. Each of a managing master encryption retransmission device and a managing slave encryption retransmission device receives a managing packet. Each of the master network switch and the slave network switch identifies a first master encryption retransmission device and a first slave encryption retransmission device based on the managing packet and enables an attack-resilient communication between a first device connected with the first master encryption retransmission device and a second device connected with the first slave encryption retransmission device.

20 Claims, 10 Drawing Sheets

METHODS, SYSTEMS, APPARATUSES, AND DEVICES FOR FACILITATING ATTACK-RESILIENT COMMUNICATIONS BETWEEN DEVICES

GOVERNMENT INTEREST

This invention was made with Government support under the Small Business Technology Transfer (STTR) Funding Agreement Number FA864923P0345 awarded by the U.S. Air Force Research Laboratory, AFWERX. The Government has certain rights in this invention.

FIELD OF THE INVENTION

Generally, the present disclosure relates to the field of data processing. More specifically, the present disclosure relates to methods, systems, apparatuses, and devices for facilitating attack-resilient communications between devices.

BACKGROUND OF THE INVENTION

Existing techniques for facilitating attack-resilient communications between devices are deficient with regard to several aspects. For instance, current technologies are designed to facilitate a point-to-point communication in which tunnels are established between two cryptographically bound devices. As a result, different technologies are needed that facilitate extendable communication in which tunnels are able to be established between multiple devices. Furthermore, current technologies are designed to be implemented as a moderate topology (e.g., one sensor is sending data back to a central hub and will never talk to any other hub or another End User Device).

Therefore, there is a need for improved methods, systems, apparatuses, and devices for facilitating attack-resilient communications between devices that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a system facilitating attack-resilient communications between devices, in accordance with some embodiments. Further, the system may include a master system. Further, the master system may include a master network switch and a plurality of master encryption retransmission devices. Further, the master network switch may include a plurality of master ports. Further, the plurality of master encryption retransmission devices may be connected with the master network switch through the plurality of master ports. Further, each of the plurality of master encryption retransmission devices associated with each of the plurality of master ports may include at least one master encryption unit and a master communication unit communicatively coupled with the at least one master encryption unit. Further, the master system may be configurable for connecting with at least one slave system. Further, each of the at least one slave system may include a slave network switch and a plurality of slave encryption retransmission devices connected with the slave network switch using a plurality of slave ports of the slave network switch. Further, each of a managing master encryption retransmission device of the plurality of master encryption retransmission devices associated with a managing master port of the plurality of master ports and a managing slave encryption retransmission device of the plurality of slave encryption retransmission devices associated with a slave managing port of the plurality of slave ports may be configured for receiving a managing packet. Further, each of the master network switch and the slave network switch may be configured for identifying a first master encryption retransmission device of the plurality of master encryption retransmission devices and a first slave encryption retransmission device of the plurality of slave encryption retransmission devices based on the managing packet. Further, each of the master network switch and the slave network switch may be configured for enabling an attack-resilient communication between a first device connected with a first master communication unit of the first master encryption retransmission device via a first external encryption retransmission device and a second device connected with a first slave communication unit of the first slave encryption retransmission device via a second external encryption retransmission device.

Further disclosed herein is a system for facilitating attack-resilient communications between devices, in accordance with some embodiments. Further, the system may include a master system and at least one slave system. Further, the master system may include a master network switch and a plurality of master encryption retransmission devices. Further, the master network switch may include a plurality of master ports. Further, the plurality of master encryption retransmission devices may be connected with the master network switch through the plurality of master ports. Further, each of the plurality of master encryption retransmission devices associated with each of the plurality of master ports may include at least one master encryption unit and a master communication unit communicatively coupled with the at least one master encryption unit. Further, the at least one slave system may include a slave network switch and a plurality of slave encryption retransmission devices connected with the slave network switch using a plurality of slave ports of the slave network switch. Further, the master system may be configured to be connected with the at least one slave system. Further, the connecting of the master system with the at least one slave system may include communicatively coupling a second master communication unit of a second master encryption retransmission device of the plurality of master encryption retransmission devices with a second slave communication unit of a second slave encryption retransmission device of the plurality of slave encryption retransmission devices. Further, each of the at least one slave system may include a slave network switch and a plurality of slave encryption retransmission devices connected with the slave network switch using a plurality of slave ports of the slave network switch. Further, each of a managing master encryption retransmission device of the plurality of master encryption retransmission devices associated with a managing master port of the plurality of master ports and a managing slave encryption retransmission device of the plurality of slave encryption retransmission devices associated with a slave managing port of the plurality of slave ports may be configured for receiving a managing packet. Further, each of the master network switch and the slave network switch may be configured for identifying a first master encryption retransmission device of the plurality of master encryption retransmission devices and a first slave encryption retransmission device of the plurality of slave encryption retransmission devices based on the managing packet. Further, each of the master network switch and the slave network switch may be configured for enabling an attack-resilient communication between a first device connected with a first master communication unit of the first master encryption retransmission device via a first external encryption retransmission device and a second device connected with a first slave communication unit of the first slave encryption retransmission device via a second external encryption retransmission device.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
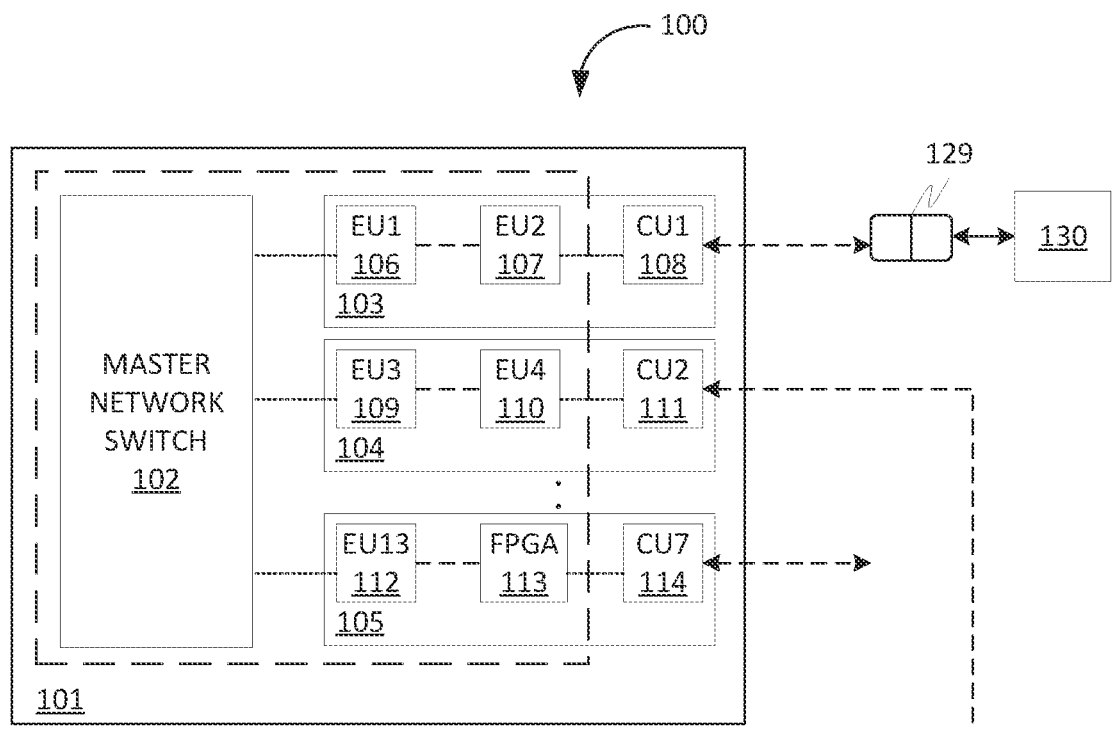
FIG. 1 is a block diagram of a system 100 facilitating attack-resilient communications between devices, in accordance with some embodiments.
Figure 1:
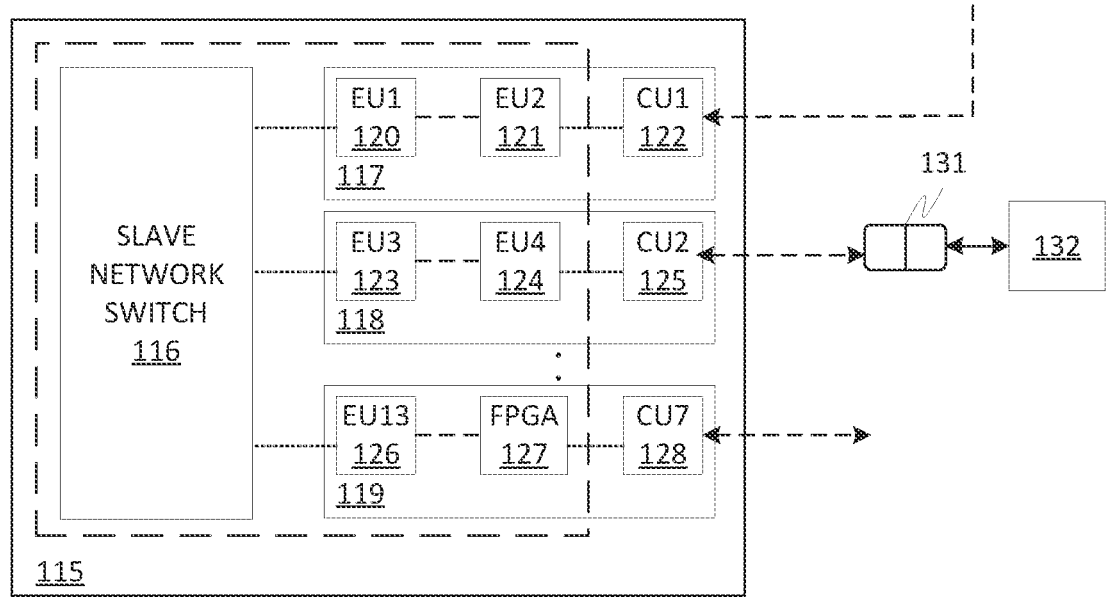

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating attack-resilient communications between devices, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer and/or computing device may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer and/or computing device may include a communication device configured for communicating with one or more external devices. The one or more external devices may include, for example, but are not limited to, a client device, a third-party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer and/or computing device may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role-based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses, and devices for facilitating attack-resilient communications between devices.

Further, the disclosed system implements a protocol free encryption device (PFED) (see U.S. patent application Ser. No. 17/200,468, entitled "PROTOCOL FREE ENCRYPTING DEVICE," filed Mar. 12, 2021; incorporated herein by reference). Further, the protocol free encryption device (PFED) may be implemented as an encryption retransmission device in a system for facilitating attack-resilient communication between devices (end user devices).

Further, the encryption retransmission device may include galvanic isolation to isolate data and power pins between encryption units and the communication units of the encryption retransmission device to protect against attacks such as PowerHammer. Further, the encryption retransmission device may include a network interface module (NIM) that on-boards all communication interfaces onto a PCB (printed circuit board) comprising the encryption units and communication units, connecting through the communication units to maintain a protocol break (see, U.S. patent application Ser. No. 17/200,468, entitled "PROTOCOL FREE ENCRYPTING DEVICE." filed Mar. 12, 2021; incorporated herein by reference), thus allowing for wireless communications. Further, the encryption units and the communication units are computing devices. Further, the PCB is encased in resin to prevent tampering and protect against BitWhisper (heat emission) attacks. Further, the encryption retransmission device may also include an Anomaly Detector (AD) (or anti-tamper) that uses three different algorithms acting independently to detect anomalies that may signal an attack. The algorithms of the AD use multi-variant signal analysis. Further, the AD is capable of warning an operator and also executing an "immune system" type of response. Further, the encryption retransmission device may also include an inner case (Faraday Cage) to limit the leaking of radio signals from the encryption retransmission device, and further prevent access by an attacker. Further, the encryption retransmission device may also include a custom resin/plastic outer case to allow integration into multiple use cases. Further, the encryption retransmission device also provides a Four-hour backup battery operation. Further, the inner cage of the encryption retransmission device may be Extruded Aluminum Inner Case that houses the PCB and acts as a Faraday cage. Further, the anomaly detector may include a Raspberry Pi4 loaded with a software application. Further, a case of the anomaly detector is designed to be interlocked with the outer case of the encryption retransmission device (Isidore device) forming an Isidore Quantum device. Further, the encryption retransmission device (Isidore device) includes an embedded software application. Further, the anomaly detector may include multiple models such as Azure Anomaly Detector, Anomaly-Transformer, Anomaly Autoencoder, GLocalKD, STL, and RDP. Each AD will have three different models working independently to detect anomalies. An aggregator determines an attack based on the outputs of the three models. Further, the models are randomly installed on each AD. Further, the PFED incorporated in the disclosed system may be an encrypting device. Further, two encrypting devices are paired to provide communications between two trusted elements via an untrusted network. Further, any device in a network address space may be a trusted element. Further, the network address space may be a subnet in an enterprise network. Further, the device may include a smartphone, a tablet, a laptop, a desktop, a router, etc. are examples of devices in a network address space.

Further, each of the trusted elements, includes an interface, for receiving a trusted interconnect, providing a wired connection between the two encrypting devices, and the trusted element, thereby providing communications between the trusted element and the encrypting device. Further, the encrypting devices are associated with the trusted elements via trusted interconnects. Further, the two encrypting devices need to be paired to allow communication between the trusted elements.

Each sending trusted element generates native packets to be received by another trusted element. Further, the native packets may take any form that would allow the native packets to normally travel between the trusted elements without encrypting devices. Further, the native packets may include a data packet riding in a frame, an IP packet riding in an Ethernet frame, etc. Further, each of the encrypting devices may include an encryption unit and a communication unit linked to the encryption unit via a connectionless interconnect provided by a bus. The connectionless interconnect utilizes a point-to-point connectionless protocol for the transmission of messages between the encryption unit and the communication unit. This point-to-point connectionless interconnect simply sends messages between the encryption unit and the communication unit. No arrangement (such as a handshake) is made between the encryption unit and the communication unit before messages are sent; Each encryption unit is configured with a key for encrypting and decrypting messages. For trusted elements to communicate, the encryption unit's keys of the two encrypting devices must match.

The encryption devices include interfaces and a one-way interface. Each interface may include an Ethernet port, a serial port, or a USB port. Further, the interfaces may be in communication with the trusted element interface of the trusted element via the trusted interconnect, e.g., an Ethernet cable, a serial wire, or a USB cable. Further, the interfaces are not associated with an address. The interfaces are not addressable and therefore, the messages are treated strictly as data, not as network packets before processing by the encryption unit.

The one-way interface may include a GPIO pin, a twisted pair wire, etc. The one-way interface allows for instructions generated by the encryption unit to be signaled to the communication unit. Further, the instructions may instruct the communication unit to halt operations.

Further, the passive interface and an active/addressable interface are both included in each communication unit. Through the connectionless interconnection, the passive interface of the communication unit of one encrypting device is in contact with the second passive interface of the encryption unit of the other encrypting device. The address is linked to the active/addressable interface. To transmit any packets from the passive interface into a form that will be routable to the other communication unit of the paired PFED, the communication unit of one encrypting device is paired with the communication unit of the other encrypting device. The Internet or other untrusted networks are used for communications between communication units. Further, the native packet is also created by one trusted element and sent to the other as part of the communications between the trusted elements. The native packet could be an Ethernet frame, for instance, and could have a frame header containing the source and destination addresses. Through the trusted interconnect and the encryption unit's interface, the native packet is sent to the other encryption unit of the other encrypting device. The encryption unit ingests the entire native pack (including the frame header and the payload) when it receives the native packet and encrypts the entire native packet using the encryption key. To create an outgoing connectionless datagram, the encryption unit additionally adds a connectionless header to the encrypted native packet. An atomic, stateless datagram is the connectionless datagram.

Fields indicating message boundaries (such as length, character count, size, etc.) or other static properties of the message may be included in the connectionless header. Using pre-established criteria connected to the fields of the connectionless header, the receiver is free to accept or reject a frame regardless of the connectionless datagram's contents. The connectionless header may also contain fields like the length. The maximum length of the frame that the receiver (i.e., the encryption unit or the communication unit) will accept may be bound by a pre-specified constant. The receiver may safely discard the connectionless datagram if its size exceeds the predetermined maximum length, as determined by the receiver. The connectionless header does not contain any dynamic properties, so the receiver can process a frame without keeping track of any previous state data. This greatly simplifies the logic and state machine needed by the receiver to correctly process the connectionless header. Human inspection is capable of reaching a known termination in each state. The ability to assess the security boundary logic for certification and correctness is significantly improved as a result.

The untrusted network can comprehend the intricate header, which permits the delivery of the packet to the paired communication unit. The complex header, for instance, contains both a source address and a destination address. Dynamically defined fields may also be present in the complex header. In order to deliver the packet to the paired communication unit (the communication unit of the encrypting device), the untrusted network routes the packet as necessary. A connectionless header is added to the connectionless datagram to create an incoming connectionless datagram after the communication unit of the encrypting device removes the complex header added by the communication unit and receives the packet. The connectionless header may have fields indicating message boundaries (such as length) or other static properties of the message, as previously mentioned.

A trust boundary between the trusted environment (trusted network) and the untrusted environment (untrusted network) is created by the encryption device pair, which offers a cryptographically paired, point-to-point link that enforces logical and physical isolation. By placing independent devices at the endpoints of the connectionless interconnect (i.e., the communication unit and the encryption unit), the physical isolation is achieved. The communication unit handles the intricate native untrusted network processing independently from the encryption unit's straightforward connectionless network processing. By converting the untrusted native packet sent to the active/addressable interface into a connectionless packet, the logical isolation is achieved. The native packet is always encrypted before it passes from the trusted element to the communication unit and is cryptographically authenticated by the encryption unit of the paired encrypting device before it is allowed to pass to the trusted element.

An entity situated on the communication unit side of the connectionless-interconnect cannot create a packet that has meaning for the trusted element unless the key is known to that entity since all packets arriving at the trusted element must be received via the encryption unit. An encrypting device pair, or encrypting device pair, establishes a tunnel across the untrusted network to connect two devices in trusted spaces via a virtual wire through untrusted spaces. The environments that are trusted and untrusted are totally separate from one another. No information is shared about the other. This is meant by "protocol-free". Networking and encryption "protocols" are separate from one another. Additionally, the encryption units are set up to send inter-PFED control messages so they can communicate with one another.

The cryptographic state of the encryption units is managed by means of these inter-PFED control messages. In order to rekey, manage the cryptographic algorithm, manage the status of the encryption units (e.g., log, online/offline, etc.), start a new session, etc., the PFED's encryption unit may also generate an inter-PFED control message for delivery to the PFED's encryption unit. These inter-PFED control messages are packetized as connectionless packets and travel along the same PFED-to-PFED tunnel as the native packets originating at the trusted element, but they are identified as control messages. They originated at the encryption unit, encrypted by the encryption unit using a key, packetized, and sent along the PFED-to-PFED tunnel. The inter-PFED control messages are not sent to the trusted element because they are marked as control messages.

Further, the present disclosure describes an Isidore device. Further, the Isidore device may be an encryption retransmission device which is the PFED. Further, the Isidore device is enabled to be connected to an unlimited number of other Isidore devices, thereby allowing a Sensor or EUD (end user device) that has an Isidore device, to connect and talk securely to any other Isidore device and its associated EUD (end user device) securely.

Further, the Isidore device may be a switching device that can be slaved to an infinite number of other switches (switching devices) by assigning one of the six ports to the next switch. Further, Port 7 of the switches is always reserved as a management port (control port). The management port is able to send commands to the switch (e.g., allow EUD1 to talk to EUD 8, and so on).

Further, the disclosed device is a six-port switch, with one management port. Further, the disclosed device is scalable and allows communications between more than two cryptographically bound devices.

Further, the seven port switch contained inside the Isidore device cannot be exposed to the outside world. The only access to the switch must come through first CU (communication unit), then EU (encryption unit), and then other encryption unit (EU). Further, there are no cryptographic bypasses for the switch.

Further, the disclosed system enables the Isidore device to connect to an unlimited number of other Isidore devices, thereby allowing a Sensor or end user device (EUD) that has an Isidore device, to connect and talk securely to any other Isidore device and its associated end user device (EUD) securely.

Further, the Isidore device has seven ports associated with a 7-port switch comprised in the Isidore device. Further, the CU1 processor has a software that allows adding additional address information. For example, the Isidore device connected to an end user device 1 (EUD 1) will have an address like 0000001, and the other Isidore device which is connected to end user device 8 (EUD 8) has an address like 0000008. For EUD1 to talk to EUD8, the management console of the Isidore device and the other Isidore device would send a message to Switch 1 of the Isidore device and Switch 2 of the other Isidore device that says EUD 1 0000001 is allowed to talk to EUD 8 0000008. EUD 1 0000001 is cryptographically bound to CU1 (address 1000000) in the switch 1 and will not talk to any other port. The change in CU1 software is that, once the message from the management port is received, all messages now from address 1000000 will be routed to CU2 (200000) of the Switch 1. The 7 Port switches (switch 1 and switch 7) have an address table. Now all messages that appear on CU1 are decrypted by EU2 and then decrypted by EU1, and accepted by the switch 1, which then routes the message to EU3 which encrypts the message, then to EU4 which encrypts the message again (dual encryption), then to CU2, which adds a security wrapper to the message frame that includes address. Further, the CU2 of Switch 1 is cryptographically bound to CU1 of Switch 2. The message sent to CU1 is unwrapped, decrypted, and decrypted. The plaintext has the address and the Switch 2, routes the message through EU3, EU4, and then to CU2 (of Switch 2) and then onto the other Isidore device having the address 0000008.

FIG. 1 is a block diagram of a system 100 facilitating attack-resilient communications between devices, in accordance with some embodiments. Further, the system 100 may include a master system 101.

Further, the master system 101 may include a master network switch 102 and a plurality of master encryption retransmission devices 103-105. Further, the master network switch 102 may include a plurality of master ports. Further, the plurality of master encryption retransmission devices 103-105 may be connected with the master network switch 102 through the plurality of master ports. Further, each of the plurality of master encryption retransmission devices 103-105 associated with each of the plurality of master ports may include at least one master encryption unit (106-107, 109-110, and 112-113) and a master communication unit (108, 111, and 114) communicatively coupled with the at least one master encryption unit (106-107, 109-110, and 112-113). Further, the master system 101 may be configurable for connecting with at least one slave system 115. Further, each of the at least one slave system 115 may include a slave network switch 116 and a plurality of slave encryption retransmission devices 117-119 connected with the slave network switch 116 using a plurality of slave ports of the slave network switch 116. Further, each of a managing master encryption retransmission device 105 of the plurality of master encryption retransmission devices 103-105 associated with a managing master port of the plurality of master ports and a managing slave encryption retransmission device 119 of the plurality of slave encryption retransmission devices 117-119 associated with a slave managing port of the plurality of slave ports may be configured for receiving a managing packet. Further, the managing packet may include information for allowing the attack-resilient communication between the devices connected to ports of the master system 101 and the at least one slave system 115 using encryption retransmission devices. Further, the managing packet may include a map of addresses associated with the encryption retransmission devices and the communication units of the master system 101 and the at least one slave system 115, coupled with the encryption retransmission devices. Further, each of the master network switch 102 and the slave network switch 116 may be configured for identifying a first master encryption retransmission device 103 of the plurality of master encryption retransmission devices 103-105 and a first slave encryption retransmission device 118 of the plurality of slave encryption retransmission devices 117-119 based on the managing packet. Further, each of the master network switch 102 and the slave network switch 116 may be configured for enabling an attack-resilient communication between a first device 130 connected with a first master communication unit 108 of the first master encryption retransmission device 103 via a first external encryption retransmission device 129 and a second device 132 connected with a first slave communication unit 125 of the first slave encryption retransmission device 118 via a second external encryption retransmission device 131. Further, each of the master network switch 102 and the slave network switch 116 may be a seven-port Ethernet IC switch. Further, each of the plurality of master ports and the plurality of slave ports may be seven ports. Further, the first device 130 and the second device 132 may be a computing device, a client device, end user device, etc.

Further, in some embodiments, the connecting of the master system 101 with the at least one slave system 115 may include communicatively coupling a second master communication unit 111 of a second master encryption retransmission device 104 of the plurality of master encryption retransmission devices 103-105 with a second slave communication unit 122 of a second slave encryption retransmission device 117 of the plurality of slave encryption retransmission devices 117-119.

Further, in an embodiment, the first master communication unit 108 may be configured for receiving a first ingressing packet comprising an encrypted ingressing native packet and a complex header from the first external encryption retransmission device 129. Further, the first master communication unit 108 may be configured for removing the complex header from the first ingressing packet. Further, the first master communication unit 108 may be configured for adding a connectionless header to the first ingressing packet for forming an ingressing connectionless datagram comprising the encrypted ingressing native packet. Further, at least one first master encryption unit 106-107 of the first master encryption retransmission device 103 may be configured for decrypting the encrypted ingressing native packet of the ingressing connectionless datagram using at least one encryption key to obtain a primary egressing native packet. Further, the enabling of the attack-resilient communication may include routing the primary egressing native packet to at least one second master encryption unit 109-110 of the second master encryption retransmission device 104 by the master network switch 102. Further, the at least one second master encryption unit 109-110 may be configured for encrypting the primary egressing native packet to create a primary encrypted egressing native packet. Further, the at least one second master encryption unit 109-110 may be configured for adding the connectionless header to the primary encrypted egressing native packet to form a primary egressing connectionless datagram. Further, the second master communication unit 111 may be configured for adding the complex header to the primary egressing connectionless datagram for forming a primary egressing packet for delivery to the second slave communication unit 122. Further, the second slave communication unit 122 may be configured for receiving the primary egressing packet as a primary ingressing packet. Further, the primary ingressing packet may include a primary encrypted ingressing native packet corresponding to the primary encrypted egressing native packet and the complex header. Further, the second slave communication unit 122 may be configured for removing the complex header from the primary ingressing packet. Further, the second slave communication unit 122 may be configured for adding the connectionless header to the primary ingressing packet for forming a primary ingressing connectionless datagram. Further, at least one second slave encryption unit 120-121 of the second slave encryption retransmission device 117 may be configured for receiving the primary ingressing connectionless datagram comprising the primary encrypted ingressing native packet. Further, the at least one second slave encryption unit 120-121 may be configured for decrypting the primary encrypted ingressing native packet using the at least one encryption key to obtain an egressing native packet. Further, the enabling of the attack-resilient communication may include routing the egressing native packet to at least one first slave encryption unit 123-124 of the first slave encryption retransmission device 118 by the slave network switch 116. Further, the at least one first slave encryption unit 123-124 may be configured for encrypting the egressing native packet using the at least one encryption key to create an encrypted egressing native packet. Further, the at least one first slave encryption unit 123-124 may be configured for adding a connectionless header to the encrypted egressing native packet to form an egressing connectionless datagram. Further, the first slave communication unit 125 may be configured for receiving the egressing connectionless datagram. Further, the first slave communication unit 125 may be configured for adding the complex header to the egressing connectionless datagram for forming a first egressing packet for delivering the first egressing packet to the second external encryption retransmission device 131.

Further, in an embodiment, the first slave communication unit 125 may be configured for receiving a second ingressing packet comprising an encrypted ingressing native packet and a complex header from the second external encryption retransmission device 131. Further, the first slave communication unit 125 may be configured for removing a complex header from the second ingressing packet. Further, the first slave communication unit 125 may be configured for adding a connectionless header to the second ingressing packet for forming an ingressing connectionless datagram comprising the encrypted ingressing native packet. Further, the at least one first slave encryption unit 123-124 may be configured for decrypting the encrypted ingressing native packet of the ingressing connectionless datagram using at least one encryption key to obtain a primary egressing native packet. Further, the enabling of the attack-resilient communication may include routing the primary egressing native packet to the at least one second slave encryption unit 120-121 by the slave network switch 116. Further, the at least one second slave encryption unit 120-121 may be configured for encrypting the primary egressing native packet to create a primary encrypted egressing native packet. Further, the at least one second slave encryption unit 120-121 may be configured for adding the connectionless header to the primary encrypted egressing native packet to form a primary egressing connectionless datagram. Further, the second slave communication unit 122 may be configured for adding the complex header to the primary egressing connectionless datagram for forming a primary egressing packet for delivery to the second master communication unit 111. Further, the second master communication unit 111 may be configured for receiving the primary egressing packet as a primary ingressing packet. Further, the primary ingressing packet may include a primary encrypted ingressing native packet corresponding to the primary encrypted egressing native packet and the complex header. Further, the second master communication unit 111 may be configured for removing the complex header from the primary ingressing packet. Further, the second master communication unit 111 may be configured for adding the connectionless header to the primary ingressing packet for forming a primary ingressing connectionless datagram. Further, the at least one second master encryption unit 109-110 may be configured for receiving the primary ingressing connectionless datagram comprising the primary encrypted ingressing native packet. Further, the at least one second master encryption unit 109-110 may be configured for decrypting the primary encrypted ingressing native packet using the at least one encryption key to obtain an egressing native packet. Further, the enabling of the attack-resilient communication may include routing the egressing native packet to the at least one first master encryption unit 106-107 by the master network switch 102. Further, the at least one first master encryption unit 106-107 may be configured for encrypting the egressing native packet using the at least one encryption key to create an encrypted egressing native packet. Further, the at least one first master encryption unit 106-107 may be configured for adding a connectionless header to the encrypted egressing native packet to form an egressing connectionless datagram. Further, the first master communication unit 108 may be configured for receiving the egressing connectionless datagram. Further, the first master communication unit 108 may be configured for adding the complex header to the egressing connectionless datagram for forming a second egressing packet for delivering the second egressing packet to the first external encryption retransmission device 129.

Further, in an embodiment, the first external encryption retransmission device 129 may be associated with a first external address and the second external encryption retransmission device 131 may be associated with a second external address. Further, the master communication unit (108, 111, and 114) of each of the plurality of master encryption retransmission devices 103-105 may be associated with a master communication unit address and the slave communication unit of each of the plurality of slave encryption retransmission devices 117-119 may be associated with a slave communication unit address. Further, the managing packet may include an address map may include the first external address, the second external address, the master communication unit address, and the slave communication unit address.

Further, in an embodiment, the second master communication unit 111 may be configured for adding a security wrapper to the primary egressing packet deliverable to the second slave communication unit 122 based on the second external address. Further, the second slave communication unit 122 may be configured for unwrapping the security wrapper to reveal the second external address. Further, the slave network switch 116 may be configured for identifying the first slave communication unit 125 associated with the second external encryption retransmission device 131 using the second external address and the address map. Further, the routing of the egressing native packet to the at least one first slave encryption unit 123-124 of the first slave encryption retransmission by the slave network switch 116 may be based on the identifying of the first slave communication unit 125 associated with the second external encryption retransmission device 131.

Further, in an embodiment, the second slave communication unit 122 may be configured for adding a security wrapper to the primary egressing packet deliverable to the second master communication unit 111 based on the first external address. Further, the second master communication unit 111 may be configured for unwrapping the security wrapper to reveal the first external address. Further, the master network switch 102 may be configured for identifying the first master communication unit 108 associated with the first external encryption retransmission device 129 using the first external address and the address map. Further, the routing of the egressing native packet to the at least one first master encryption unit 106-107 by the master network switch 102 may be based on the identifying of the first master communication unit 108 associated with the first external encryption retransmission device 129.

Further, in some embodiments, the first master communication unit 108 may be communicatively paired with a first external communication unit 201 of the first external encryption retransmission device 129. Further, the first slave communication unit 125 may be communicatively paired with a second external communication unit 204 of the second external encryption retransmission device 131. Further, the first external encryption retransmission device 129 may include at least one first external encryption unit 202-203 communicatively coupled with the first external communication unit 201. Further, the second external encryption retransmission device 131 may include at least one second external encryption unit 205-206 communicatively coupled with the second external communication unit 204.

Further, in some embodiments, at least one of the at least one master encryption unit (106-107, 109-110, and 112-113) and at least one slave encryption unit (120-121, 123-124, and 126-127) of the at least one slave system 115 may include two encryption units. Further, the two encryption units are communicatively coupled.

Further, in some embodiments, the managing master encryption retransmission device 105 may include at least one managing master encryption unit 112-113 and a managing master communication unit 114. Further, the managing slave encryption retransmission device 119 may include at least one managing slave encryption unit 126-127 and a managing slave communication unit 128. Further, each of the at least one managing master encryption unit 112-113 and the at least one managing slave encryption unit 126-127 may include an encryption unit (112 and 126) and a field-programmable gate array (FPGA) (113 and 127) communicatively coupled with the encryption unit (112 and 126).

Further, in some embodiments, the at least one master encryption unit (106-107, 109-110, and 112-113) may be communicatively coupled to the master communication unit (108, 111, and 114) via a one-way connection for providing at least one instruction to the master communication unit (108, 111, and 114).

In further embodiments, the system 100 may include at least one anomaly detector (AD) (301-302 and 304-306). Further, the at least one anomaly detector (301-302 and 304-306) may be anti-tamper unit. Further, the at least one anomaly detector (301-302 and 304-306) may be a computing device. Further, the at least one anomaly detector (301-302 and 304-306) may be communicatively coupled with at least one of the plurality of master encryption retransmission devices 103-105 and the plurality of slave encryption retransmission devices 117-119. Further, the at least one anomaly detector (301-302 and 304-306) may be configured for analyzing at least one signal associated with at least one of the plurality of master encryption retransmission devices 103-105 and the plurality of slave encryption retransmission devices 117-119 using at least one machine learning model.

Further, the at least one anomaly detector (301-302 and 304-306) may be configured for determining an attack associated with at least one of the plurality of master encryption retransmission devices 103-105 and the plurality of slave encryption retransmission devices 117-119 based on the analyzing. Further, the at least one anomaly detector (301-302 and 304-306) may be configured for generating an alert for the attack based on the determining of the attack.

Figure 2:
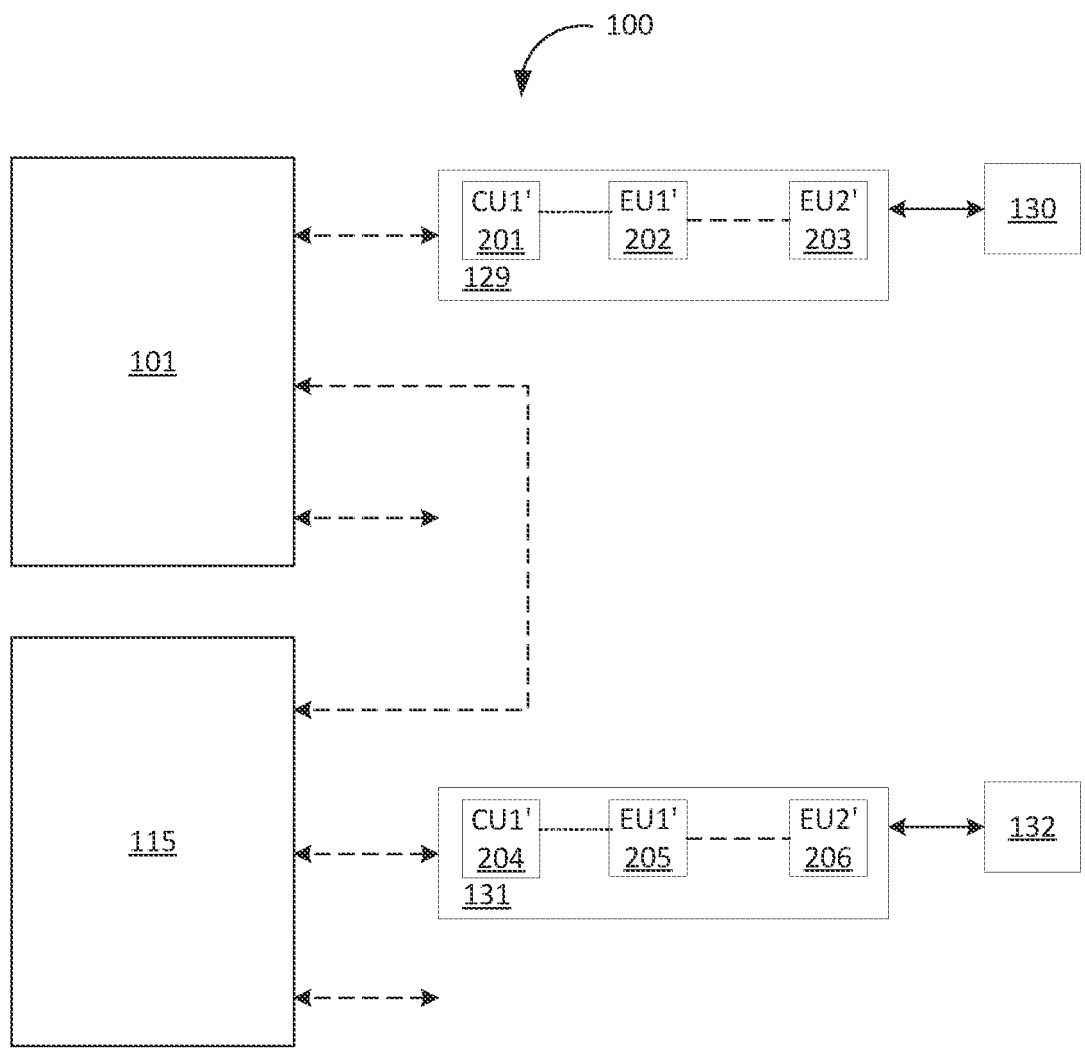
FIG. 2 is a block diagram of the system 100 with the first external encryption retransmission device 129 and the second external encryption retransmission device 131, in accordance with some embodiments.

FIG. 2 is a block diagram of the system 100 with the first external encryption retransmission device 129 and the second external encryption retransmission device 131, in accordance with some embodiments.

Figure 3:
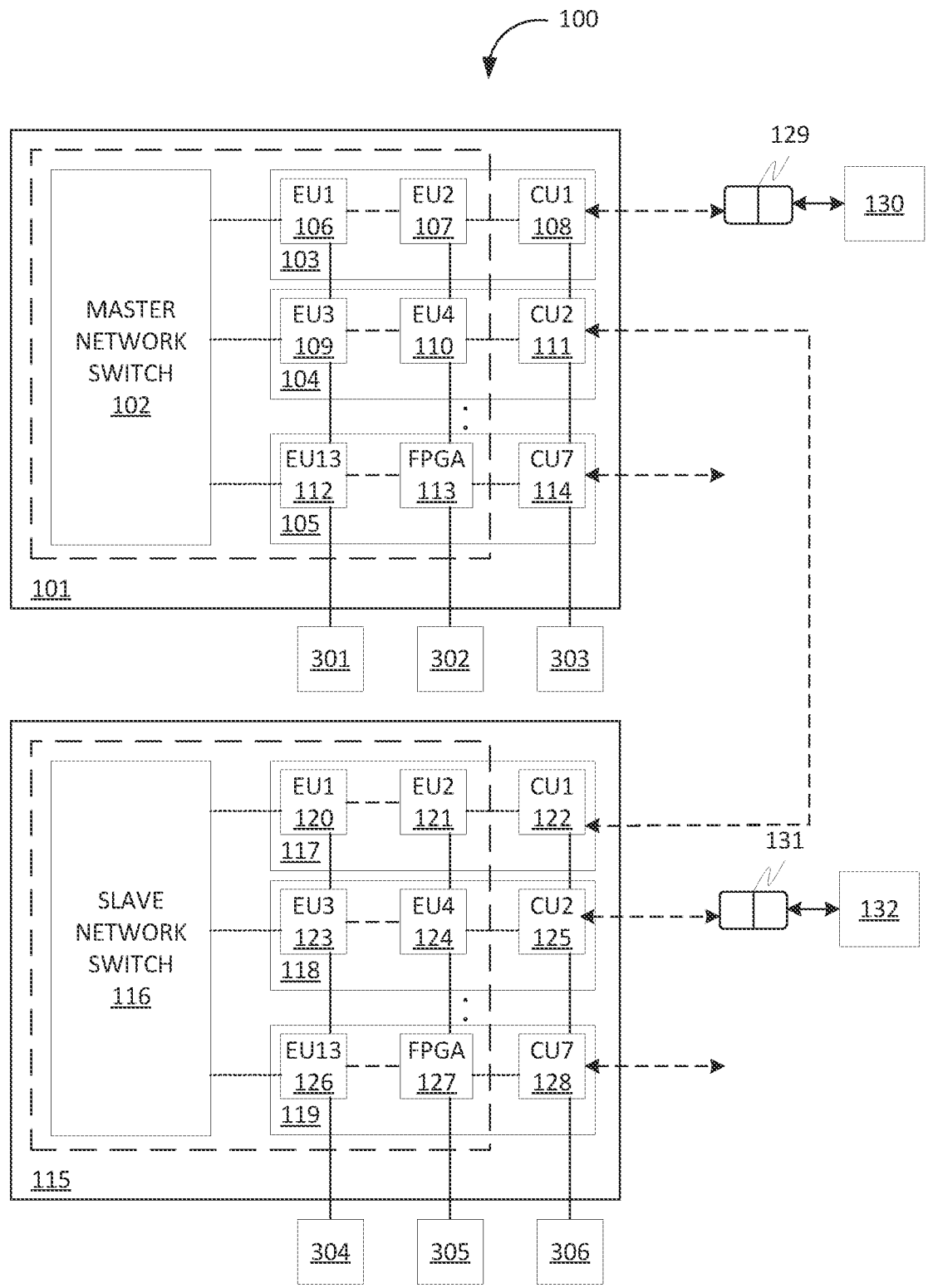
FIG. 3 is a block diagram of the system 100 with the at least one anomaly detector (301-302 and 304-306), in accordance with some embodiments.

FIG. 3 is a block diagram of the system 100 with the at least one anomaly detector (301-302 and 304-306), in accordance with some embodiments.

Figure 4:
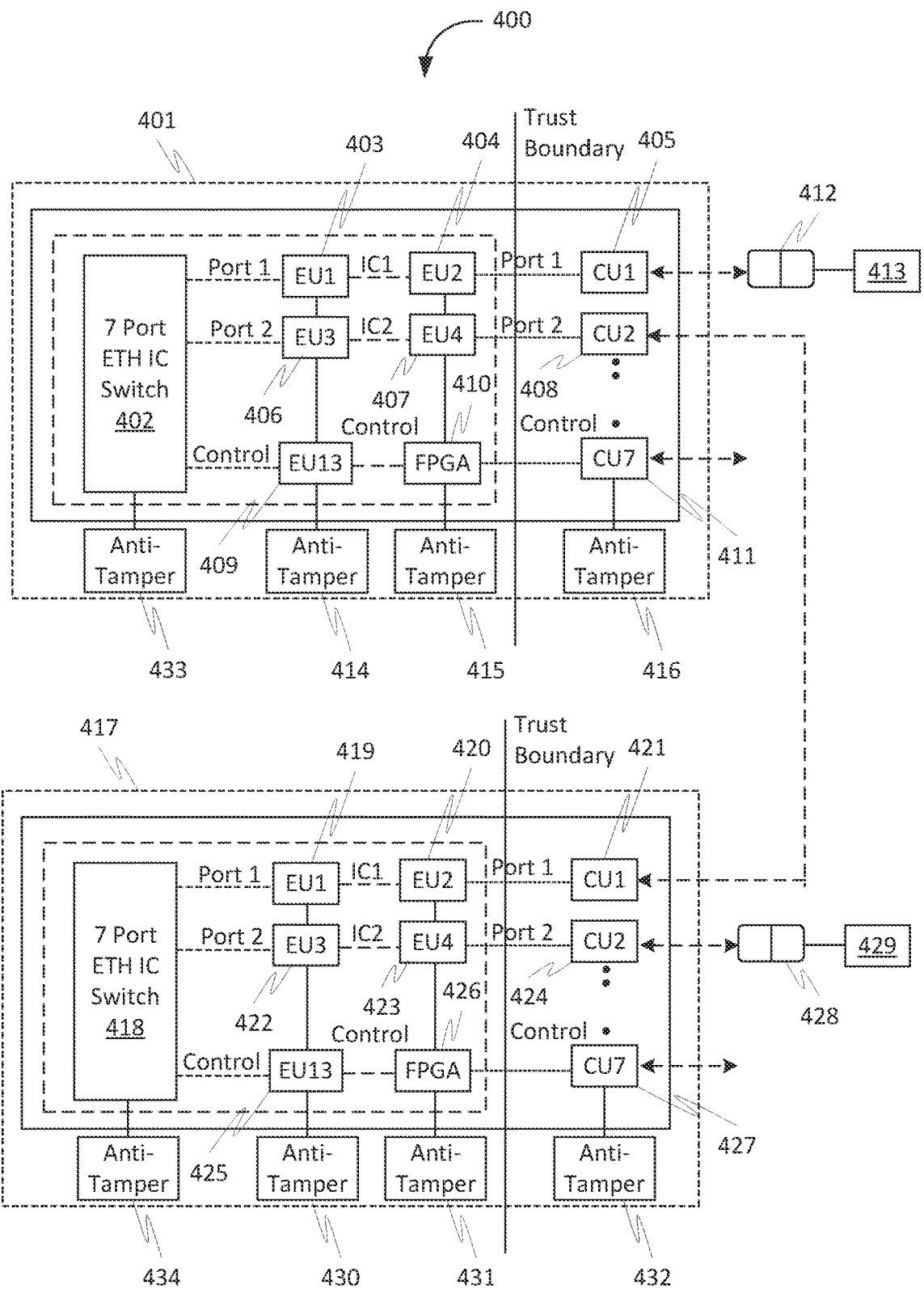
FIG. 4 is a schematic diagram of a system 400 for facilitating attack-resilient communications between devices, in accordance with some embodiments.

FIG. 4 is a schematic diagram of a system 400 for facilitating attack-resilient communications between devices, in accordance with some embodiments. Accordingly, the system 400 may include a master system 401 and at least one slave system 417.

Further, the master system 401 may include a seven-port Ethernet IC switch 402. Further, the seven-port Ethernet IC switch 402 may include a plurality of ports. Further, the plurality of ports may include port 1, port 2, control port, etc. Further, the master system 401 may include two encryption units (EU1 (403) and EU2 (404)) that are coupled together and connected to the seven-port Ethernet IC switch 402 through the port 1, a communication unit (CU1 (405)) coupled with the two encryption units (EU1 (403) and EU2 (404)) on the port 1, and an encryption retransmission device 412 which is coupled with the communication unit (CU1 (405)), is coupled with an end user device (EUD) 413. Further, the master system 401 may include two encryption units (EU3 (406) and EU4 (407)) that are coupled together and connected to the seven-port Ethernet IC switch 402 through the port 2 and a communication unit (CU2 (408)) which is coupled with the two encryption units (EU3 (406) and EU4 (407)) on the port 2, is connected to a communication unit (CU1 (421)) of the at least one slave system 417. Further, the master system 401 may include an encryption unit (EU13 (409)) and a FPGA (410) that are coupled together and connected to the seven-port Ethernet IC switch 402 through the control port and a communication unit (CU7 (411)) which is coupled with the FPGA (410) on the control port. Further, the master system 401 may include at least one anti tamper unit 414-416 coupled with the encryption units (EU1 (403), EU3 (406), and EU13 (409)), the encryption units (EU2 (404) and EU4 (407)) and the FPGA 410, and the communication units (CU1 (405), CU2 (408), and CU7 (411)). Further, the master system 401 may include an anti-tamper unit 433 for the seven-port Ethernet IC switch 402 of the master system 401. Further, the anti-tamper unit 433 may be coupled with the seven-port Ethernet IC switch 402 of the master system 401. Further, the seven-port Ethernet IC switch 402 of the master system 401 may decrypt a data packet received from the two encryption units (EU1 (403) and EU2 (404)). Further, a decrypted data packet may be temporarily stored in a memory of the seven-port Ethernet IC switch 402 of the master system 401. Further, the data packet may include an encrypted ingressing native packet. Further, the master system 401 may include a capacitor electrically coupled with the seven-port Ethernet IC switch 402 of the master system 401. Further, the capacitor may be configured for sending an electrical signal to the seven-port Ethernet IC switch 402 of the master system 401 for erasing the decrypted data packet temporarily stored in the memory of the seven-port Ethernet IC switch 402 of the master system 401 by detecting a tampering with an enclosure of the master system 401.

Further, the at least one slave system 417 may include a seven-port Ethernet IC switch 418. Further, the seven-port Ethernet IC switch 418 may include a plurality of ports. Further, the plurality of ports may include port 1, port 2, control port, etc. Further, the at least one slave system 417 may include two encryption units (EU1 (419) and EU2 (420)) that are coupled together and connected to the seven-port Ethernet IC switch 418 through the port 1 and a communication unit (CU1 (421)) which is coupled with the two encryption units (EU1 (419) and EU2 (420)) on the port 1, is coupled with the communication unit (CU2 (408)) of the master system 401. Further, the at least one slave system 417 may include two encryption units (EU3 (422) and EU4 (423)) that are coupled together and connected to the seven-port Ethernet IC switch 418 through the port 2 and a communication unit (CU2 (424)) which is coupled with the two encryption units (EU3 (422) and EU4 (423)) on the port 2, is connected to an encryption retransmission device 428 associated with an end user device (EUD) 429. Further, the at least one slave system 417 may include an encryption unit (EU13 (425)) and a FPGA (426) that are coupled together and connected to the seven-port Ethernet IC switch 418 through the control port and a communication unit (CU7 (427)) which is coupled with the FPGA (426) on the control port. Further, the at least one slave system 417 may include at least one anti tamper unit 430-432 coupled with the encryption units (EU1 (419), EU3 (422), and EU13 (425)), the encryption units (EU2 (420) and EU4 (423)) and the FPGA 426, and the communication units (CU1 (421), CU2 (424), and CU7 (427)). Further, the at least one slave system 417 may include an anti-tamper unit 434 for the seven-port Ethernet IC switch 418 of the at least one slave system 417. Further, the anti-tamper unit 434 may be coupled with the seven-port Ethernet IC switch 418 of the at least one slave system 417. Further, the seven-port Ethernet IC switch 418 of the at least one slave system 417 may decrypt a data packet received from two encryption units (EU1 (419) and EU2 (420)). Further, a decrypted data packet may be temporarily stored in a memory of the seven-port Ethernet IC switch 418 of the at least one slave system 417. Further, the data packet may include a primary encrypted ingressing native packet. Further, the at least one slave system 417 may include a capacitor electrically coupled with the seven-port Ethernet IC switch 418 of the at least one slave system 417. Further, the capacitor may be configured for sending an electrical signal to the seven-port Ethernet IC switch 418 of the at least one slave system 417 for erasing the decrypted data packet temporarily stored in the memory of the seven-port Ethernet IC switch 418 of the at least one slave system 417 by detecting a tampering with an enclosure of the at least one slave system 417.

Figure 5:
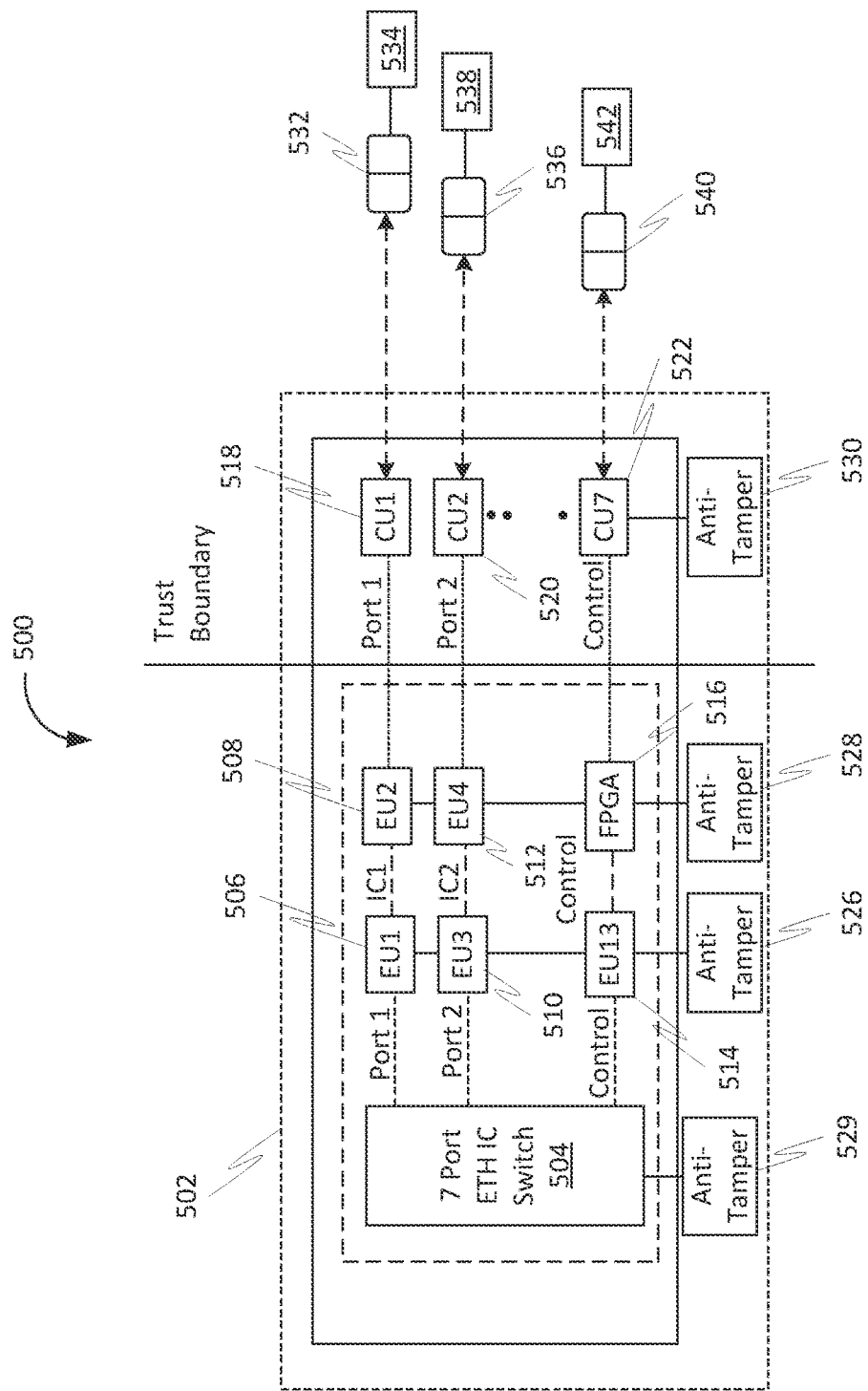
FIG. 5 is a schematic diagram of a system 500 for facilitating attack-resilient communications between devices, in accordance with some embodiments.

FIG. 5 is a schematic diagram of a system 500 for facilitating attack-resilient communications between devices, in accordance with some embodiments. Further, the system 500 may include a master system 502 comprising a seven-port Ethernet IC switch 504. Further, the seven-port Ethernet IC switch 504 may include a plurality of ports. Further, the plurality of ports may include port 1, port 2, control port, etc. Further, the master system 502 may include two encryption units (EU1 (506) and EU2 (508)) that are coupled together and connected to the seven-port Ethernet IC switch 504 through the port 1, a communication unit (CU1 (518)) coupled with the two encryption units (EU1 (506) and EU2 (508)) on the port 1, and a first encryption retransmission device 532 which is coupled with the communication unit (CU1 (518)), is coupled with a device (such as sensors, IoTs, etc.) 534. Further, the master system 502 may include two encryption units (EU3 (510) and EU4 (512)) that are coupled together and connected to the seven-port Ethernet IC switch 504 through the port 2, a communication unit (CU2 (520)) coupled with the two encryption units (EU3 (510) and EU4 (512)) on the port 2, and a second encryption retransmission device 536 which is coupled with the communication unit (CU2 (520)), is coupled with a device (such as laptops, smartphones, CubeStats, computers, etc.) 538. Further, the master system 502 may include an encryption unit (EU13 (514)) and a FPGA (516) that are coupled together and connected to the seven-port Ethernet IC switch 504 through the control port, a communication unit (CU7 (522)) coupled with the FPGA (516) on the control port, and a third encryption retransmission device 540 which is coupled with the communication unit (CU7 (522)), is coupled with a device 542. Further, the master system 502 may include at least one anti tamper unit 526-530 coupled with the encryption units (EU1 (506), EU3 (510), and EU13 (514)), the encryption units (EU2 (508) and EU4 (512)) and the FPGA 516, and the communication units (CU1 (518), CU2 (520), and CU7 (522)). Further, the master system 502 may include an anti-tamper unit 529 for the seven-port Ethernet IC switch 504 of the master system 502. Further, the anti-tamper unit 529 may be coupled with the seven-port Ethernet IC switch 504 of the master system 502.

Figure 6:
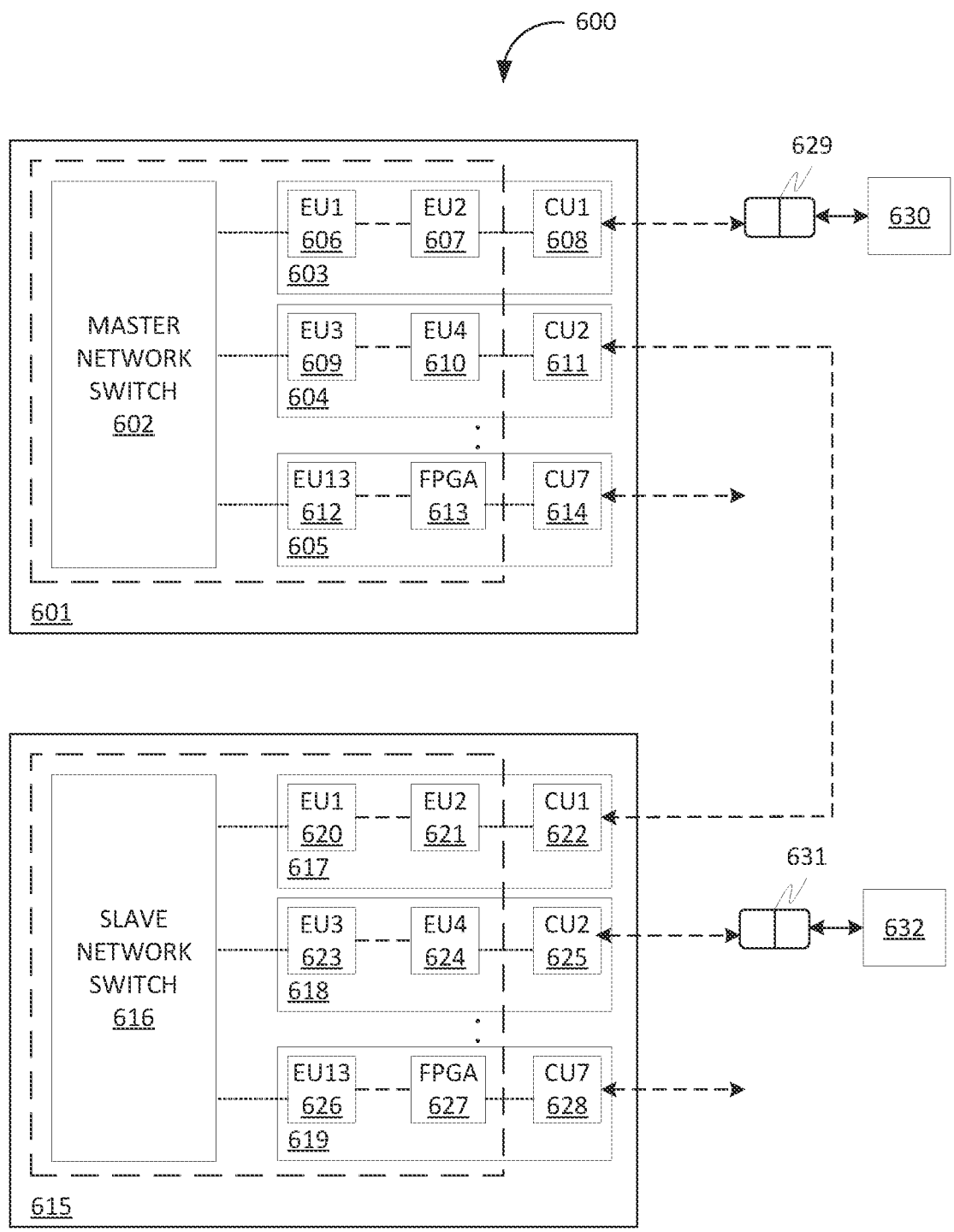
FIG. 6 is a block diagram of a system 600 for facilitating attack-resilient communications between devices, in accordance with some embodiments.

FIG. 6 is a block diagram of a system 600 for facilitating attack-resilient communications between devices, in accordance with some embodiments. Further, the system 600 may include a master system 601 and at least one slave system 615.

Further, the master system 601 may include a master network switch 602 and a plurality of master encryption retransmission devices 603-605. Further, the master network switch 602 may include a plurality of master ports. Further, the plurality of master encryption retransmission devices 603-605 may be connected with the master network switch 602 through the plurality of master ports. Further, each of the plurality of master encryption retransmission devices 603-605 associated with each of the plurality of master ports may include at least one master encryption unit (606-607, 609-610, and 612-613) and a master communication unit (608, 611, and 614) communicatively coupled with the at least one master encryption unit (606-607, 609-610, and 612-613).

Further, the at least one slave system 615 may include a slave network switch 616 and a plurality of slave encryption retransmission devices 617-619 connected with the slave network switch 616 using a plurality of slave ports of the slave network switch 616. Further, the master system 601 may be configured to be connected with the at least one slave system 615. Further, the connecting of the master system 601 with the at least one slave system 615 may include communicatively coupling a second master communication unit 611 of a second master encryption retransmission device 604 of the plurality of master encryption retransmission devices 603-605 with a second slave communication unit 622 of a second slave encryption retransmission device 617 of the plurality of slave encryption retransmission devices 617-619. Further, each of the at least one slave system 615 may include a slave network switch 616 and a plurality of slave encryption retransmission devices 617-619 connected with the slave network switch 616 using a plurality of slave ports of the slave network switch 616. Further, each of a managing master encryption retransmission device 605 of the plurality of master encryption retransmission devices 603-605 associated with a managing master port of the plurality of master ports and a managing slave encryption retransmission device 619 of the plurality of slave encryption retransmission devices 617-619 associated with a slave managing port of the plurality of slave ports may be configured for receiving a managing packet. Further, each of the master network switch 602 and the slave network switch 616 may be configured for identifying a first master encryption retransmission device 603 of the plurality of master encryption retransmission devices 603-605 and a first slave encryption retransmission device 618 of the plurality of slave encryption retransmission devices 617-619 based on the managing packet. Further, each of the master network switch 602 and the slave network switch 616 may be configured for enabling an attack-resilient communication between a first device 630 connected with a first master communication unit 608 of the first master encryption retransmission device 603 via a first external encryption retransmission device 629 and a second device 632 connected with a first slave communication unit 625 of the first slave encryption retransmission device 618 via a second external encryption retransmission device 631.

Further, in some embodiments, the first master communication unit 608 may be configured for receiving a first ingressing packet comprising an encrypted ingressing native packet and a complex header from the first external encryption retransmission device 629. Further, the first master communication unit 608 may be configured for removing the complex header from the first ingressing packet. Further, the first master communication unit 608 may be configured for adding a connectionless header to the first ingressing packet for forming an ingressing connectionless datagram comprising the encrypted ingressing native packet. Further, at least one first master encryption unit 606-607 of the first master encryption retransmission device 603 may be configured for decrypting the encrypted ingressing native packet of the ingressing connectionless datagram using at least one encryption key to obtain a primary egressing native packet. Further, the enabling of the attack-resilient communication may include routing the primary egressing native packet to at least one second master encryption unit 609-610 of the second master encryption retransmission device 604 by the master network switch 602. Further, the at least one second master encryption unit 609-610 may be configured for encrypting the primary egressing native packet to create a primary encrypted egressing native packet. Further, the at least one second master encryption unit 609-610 may be configured for adding the connectionless header to the primary encrypted egressing native packet to form a primary egressing connectionless datagram. Further, the second master communication unit 611 may be configured for adding the complex header to the primary egressing connectionless datagram for forming a primary egressing packet for delivery to the second slave communication unit 622. Further, the second slave communication unit 622 may be configured for receiving the primary egressing packet as a primary ingressing packet. Further, the primary ingressing packet may include a primary encrypted ingressing native packet corresponding to the primary encrypted egressing native packet and the complex header. Further, the second slave communication unit 622 may be configured for removing the complex header from the primary ingressing packet. Further, the second slave communication unit 622 may be configured for adding the connectionless header to the primary ingressing packet for forming a primary ingressing connectionless datagram. Further, at least one second slave encryption unit 620-621 of the second slave encryption retransmission device 617 may be configured for receiving the primary ingressing connectionless datagram may include the primary encrypted ingressing native packet. Further, the at least one second slave encryption unit 620-621 may be configured for decrypting the primary encrypted ingressing native packet using the at least one encryption key to obtain an egressing native packet. Further, the enabling of the attack-resilient communication further may include routing the egressing native packet to at least one first slave encryption unit 623-624 of the first slave encryption retransmission device 618 by the slave network switch 616. Further, the at least one first slave encryption unit 623-624 may be configured for encrypting the egressing native packet using the at least one encryption key to create an encrypted egressing native packet. Further, the at least one first slave encryption unit 623-624 may be configured for adding a connectionless header to the encrypted egressing native packet to form an egressing connectionless datagram. Further, the first slave communication unit 625 may be configured for receiving the egressing connectionless datagram. Further, the first slave communication unit 625 may be configured for adding the complex header to the egressing connectionless datagram for forming a first egressing packet for delivering the first egressing packet to the second external encryption retransmission device 631.

Further, in an embodiment, the first slave communication unit 625 may be configured for receiving a second ingressing packet may include an encrypted ingressing native packet and a complex header from the second external encryption retransmission device 631. Further, the first slave communication unit 625 may be configured for removing a complex header from the second ingressing packet. Further, the first slave communication unit 625 may be configured for adding a connectionless header to the second ingressing packet for forming an ingressing connectionless datagram may include the encrypted ingressing native packet. Further, the at least one first slave encryption unit 623-624 may be configured for decrypting the encrypted ingressing native packet of the ingressing connectionless datagram using at least one encryption key to obtain a primary egressing native packet. Further, the enabling of the attack-resilient communication may include routing the primary egressing native packet to the at least one second slave encryption unit 620-621 by the slave network switch 616. Further, the at least one second slave encryption unit 620-621 may be configured for encrypting the primary egressing native packet to create a primary encrypted egressing native packet. Further, the at least one second slave encryption unit 620-621 may be configured for adding the connectionless header to the primary encrypted egressing native packet to form a primary egressing connectionless datagram. Further, the second slave communication unit 622 may be configured for adding the complex header to the primary egressing connectionless datagram for forming a primary egressing packet for delivery to the second master communication unit 611. Further, the second master communication unit 611 may be configured for receiving the primary egressing packet as a primary ingressing packet. Further, the primary ingressing packet may include a primary encrypted ingressing native packet corresponding to the primary encrypted egressing native packet and the complex header. Further, the second master communication unit 611 may be configured for removing the complex header from the primary ingressing packet. Further, the second master communication unit 611 may be configured for adding the connectionless header to the primary ingressing packet for forming a primary ingressing connectionless datagram. Further, the at least one second master encryption unit 609-610 may be configured for receiving the primary ingressing connectionless datagram may include the primary encrypted ingressing native packet. Further, the at least one second master encryption unit 609-610 may be configured for decrypting the primary encrypted ingressing native packet using the at least one encryption key to obtain an egressing native packet. Further, the enabling of the attack-resilient communication may further include routing the egressing native packet to the at least one first master encryption unit 606-607 by the master network switch 602. Further, the at least one first master encryption unit 606-607 may be configured for encrypting the egressing native packet using the at least one encryption key to create an encrypted egressing native packet. Further, the at least one first master encryption unit 606-607 may be configured for adding a connectionless header to the encrypted egressing native packet to form an egressing connectionless datagram. Further, the first master communication unit 608 may be configured for receiving the egressing connectionless datagram. Further, the first master communication unit 608 may be configured for adding the complex header to the egressing connectionless datagram for forming a second egressing packet for delivering the second egressing packet to the first external encryption retransmission device 629.

Further, in an embodiment, the first external encryption retransmission device 629 may be associated with a first external address and the second external encryption retransmission device 631 may be associated with a second external address. Further, the master communication unit (608, 611, and 614) of each of the plurality of master encryption retransmission devices 603-605 may be associated with a master communication unit address and the slave communication unit of each of the plurality of slave encryption retransmission devices 617-619 may be associated with a slave communication unit address. Further, the managing packet may include an address map may include the first external address, the second external address, the master communication unit address, and the slave communication unit address.

Further, in an embodiment, the second master communication unit 611 may be configured for adding a security wrapper to the primary egressing packet deliverable to the second slave communication unit 622 based on the second external address. Further, the second slave communication unit 622 may be configured for unwrapping the security wrapper to reveal the second external address. Further, the slave network switch 616 may be configured for identifying the first slave communication unit 625 associated with the second external encryption retransmission device 631 using the second external address and the address map. Further, the routing of the egressing native packet to the at least one first slave encryption unit 623-624 of the first slave encryption retransmission by the slave network switch 616 may be further based on the identifying of the first slave communication unit 625 associated with the second external encryption retransmission device 631.

Further, in an embodiment, the second slave communication unit 622 may be configured for adding a security wrapper to the primary egressing packet deliverable to the second master communication unit 611 based on the first external address. Further, the second master communication unit 611 may be configured for unwrapping the security wrapper to reveal the first external address. Further, the master network switch 602 may be configured for identifying the first master communication unit 608 associated with the first external encryption retransmission device 629 using the first external address and the address map. Further, the routing of the egressing native packet to the at least one first master encryption unit 606-607 by the master network switch 602 may be further based on the identifying of the first master communication unit 608 associated with the first external encryption retransmission device 629.

Further, in some embodiments, the first master communication unit 608 may be communicatively paired with a first external communication unit of the first external encryption retransmission device 629. Further, the first slave communication unit 625 may be communicatively paired with a second external communication unit of the second external encryption retransmission device 631.

Further, in some embodiments, the at least one master encryption unit (606-607, 609-610, and 612-613) may be communicatively coupled to the master communication unit (608, 611, and 614) via a one-way connection for providing at least one instruction to the master communication unit (608, 611, and 614).

Figure 7:
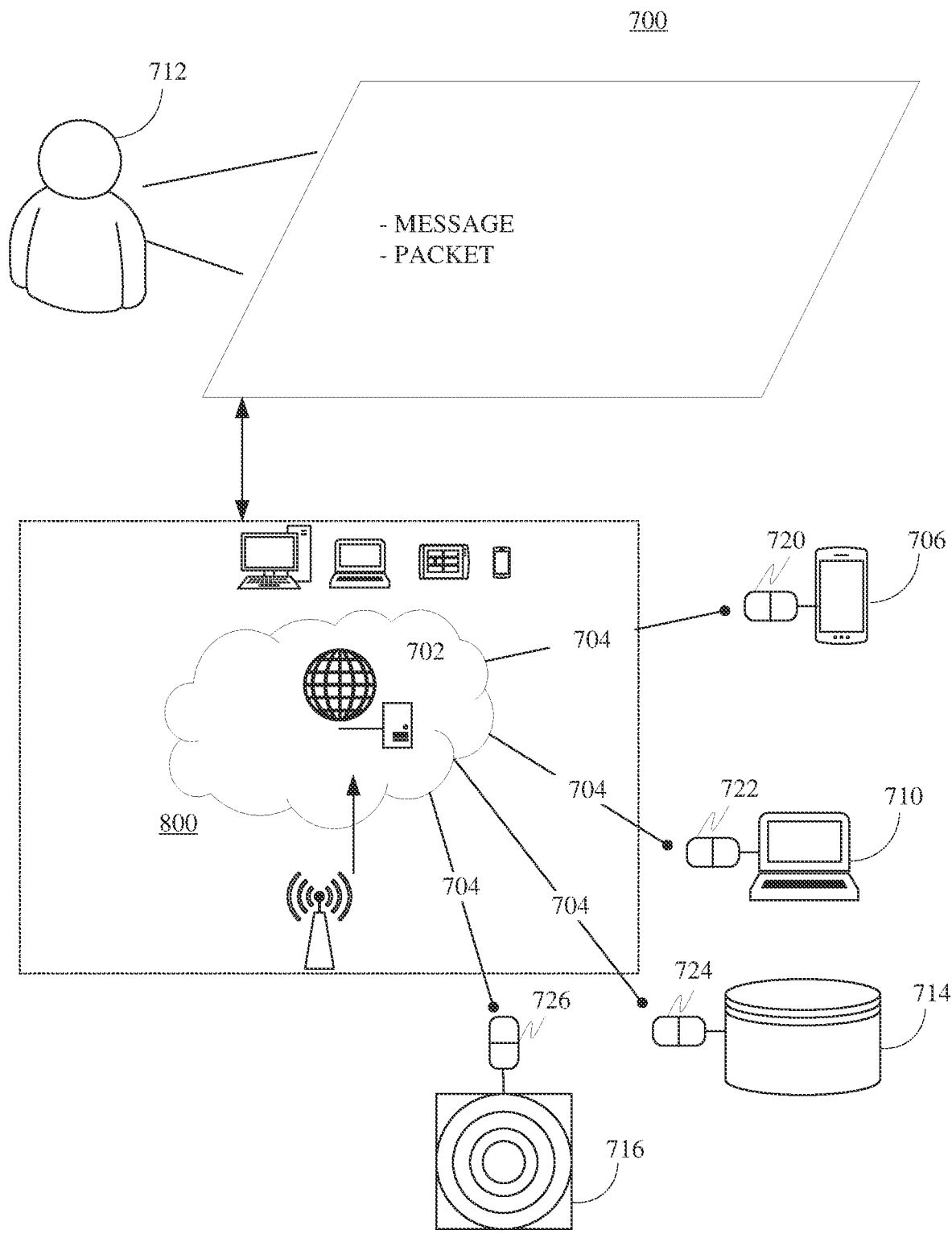
FIG. 7 is an illustration of an online platform consistent with various embodiments of the present disclosure.

FIG. 7 is an illustration of an online platform 700 consistent with various embodiments of the present disclosure. By way of non-limiting example, the online platform 700 to facilitate attack-resilient communications between devices may be hosted on a centralized server 702, such as, for example, a cloud computing service. The centralized server 702 may communicate with other network entities, such as, for example, a mobile device 706 (such as a smartphone, a laptop, a tablet computer, etc.), other electronic devices 710 (such as desktop computers, server computers, etc.), databases 714, and sensors 716 over a communication network 704, such as, but not limited to, the Internet. Further, the mobile device 716 may be connected with a first encryption retransmission device 720, the electronic device 710 may be connected with a second encryption retransmission device 722, the databases 714 may be connected with a third encryption retransmission device 724, the sensors 716 may be connected with a fourth encryption retransmission device 724. Further, the network entities may communicate with each other using an encryption retransmission device connected with each network entity. Further, users of the online platform 700 may include relevant parties such as, but not limited to, end-users, administrators, service providers, service consumers, and so on. Accordingly, in some instances, electronic devices operated by the one or more relevant parties may be in communication with the platform.

A user 712, such as the one or more relevant parties, may access online platform 700 through a web-based software application or browser. The web-based software application may be embodied as, for example, but not be limited to, a website, a web application, a desktop application, and a mobile application compatible with a computing device 800.

Figure 8:
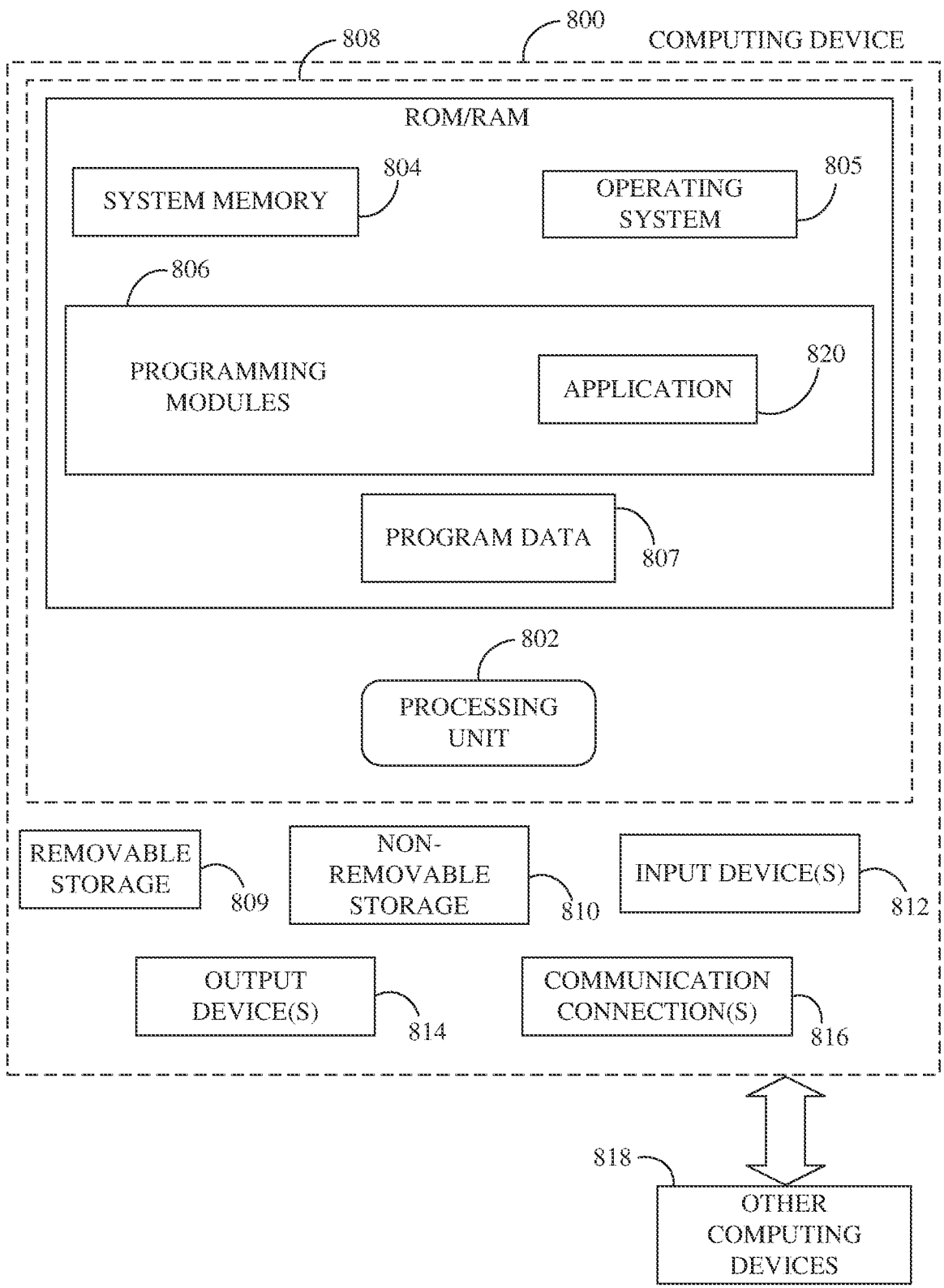
FIG. 8 is a block diagram of a computing device for implementing the methods disclosed herein, in accordance with some embodiments.

With reference to FIG. 8, a system consistent with an embodiment of the disclosure may include a computing device or cloud service, such as computing device 800. In a basic configuration, computing device 800 may include at least one processing unit 802 and a system memory 804. Depending on the configuration and type of computing device, system memory 804 may comprise, but is not limited to, volatile (e.g., random-access memory (RAM)), non-volatile (e.g., read-only memory (ROM)), flash memory, or any combination. System memory 804 may include operating system 805, one or more programming modules 806, and may include a program data 807. Operating system 805, for example, may be suitable for controlling computing device 800's operation. In one embodiment, programming modules 806 may include image-processing module, machine learning module. Furthermore, embodiments of the disclosure may be practiced in conjunction with a graphics library, other operating systems, or any other application program and is not limited to any particular application or system. This basic configuration is illustrated in FIG. 8 by those components within a dashed line 808.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by a removable storage 809 and a non-removable storage 810. Computer storage media may include volatile and non-volatile, removable and non-removable media implemented in any method or technology for storage of information, such as computer-readable instructions, data structures, program modules, or other data. System memory 804, removable storage 809, and non-removable storage 810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 800. Any such computer storage media may be part of device 800. Computing device 800 may also have input device(s) 812 such as a keyboard, a mouse, a pen, a sound input device, a touch input device, a location sensor, a camera, a biometric sensor, etc. Output device(s) 814 such as a display, speakers, a printer, etc. may also be included. The aforementioned devices are examples and others may be used.

Computing device 800 may also contain a communication connection 816 that may allow device 800 to communicate with other computing devices 818, such as over a network in a distributed computing environment, for example, an intranet or the Internet. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 804, including operating system 805. While executing on processing unit 802, programming modules 806 (e.g., application 820 such as a media player) may perform processes including, for example, one or more stages of methods, algorithms, systems, applications, servers, databases as described above. The aforementioned process is an example, and processing unit 802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 9:
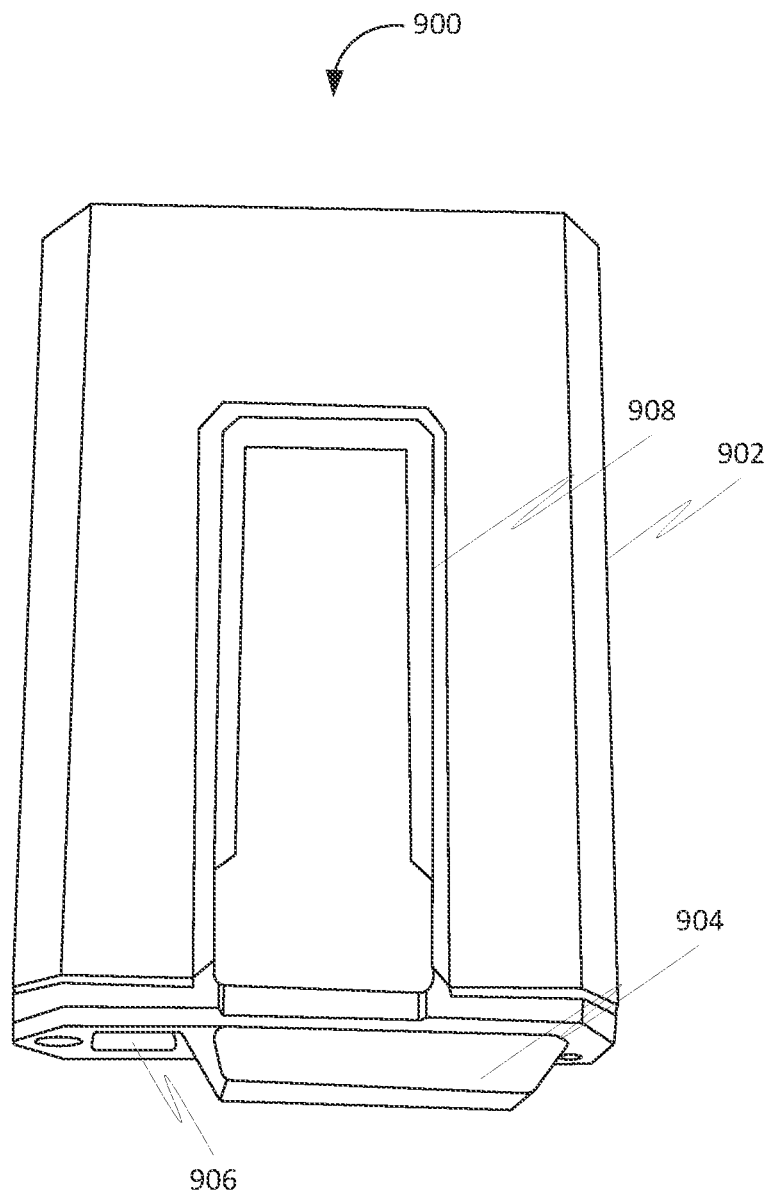
FIG. 9 is a top view of a device 900 comprising at least one of a master system and at least one slave system of a system for facilitating attack-resilient communications between devices, in accordance with some embodiments.

FIG. 9 is a top view of a device 900 comprising at least one of a master system and at least one slave system of a system for facilitating attack-resilient communications between devices, in accordance with some embodiments. Accordingly, the device 900 may include an enclosure 902 comprising an antenna compartment 904. Further, the device 900 secures Ethernet, USB, 4G/5G, Bluetooth, and Infrared communications. Further, the device 900 may include a communication unit associated with the antenna compartment 904. Further, the device 900 may include a reset button 906. Further, the enclosure 902 may include a slot 908 on a surface of the enclosure 902. Further, the slot 908 may be a connector for connecting an additional device to the device 900. Further, the additional device may be snapped onto the device 900 using the slot 908.

Figure 10:
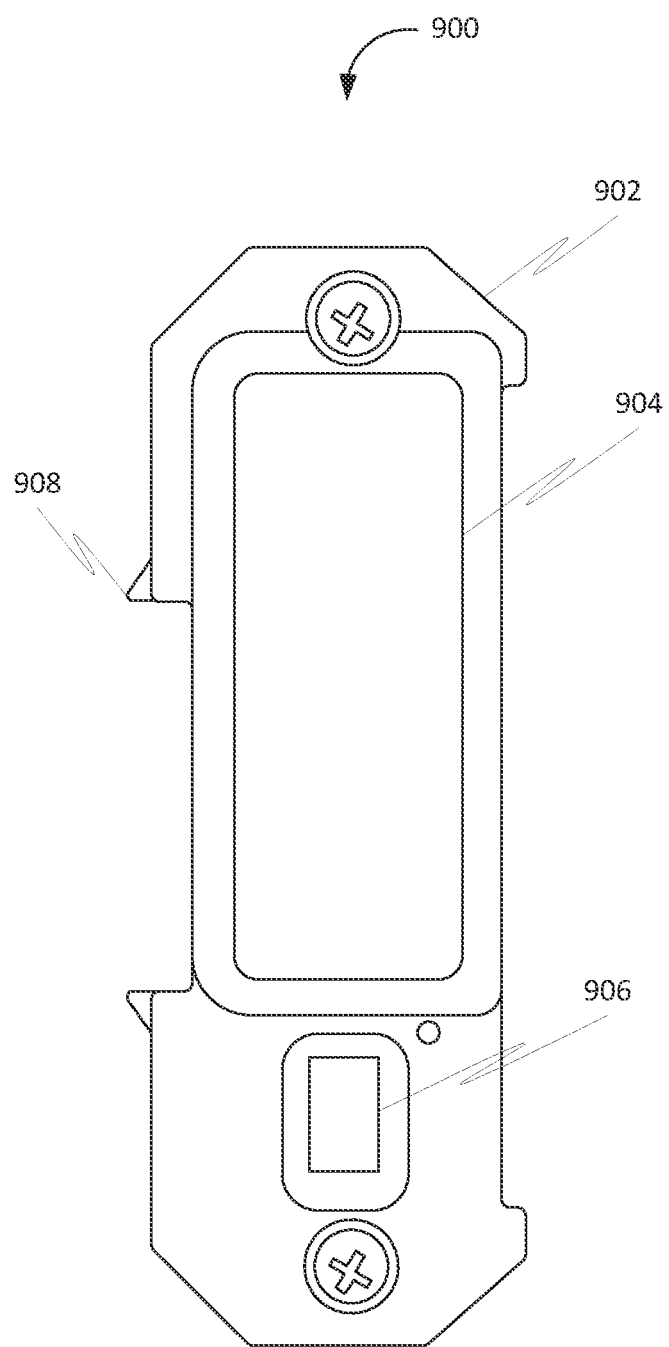
FIG. 10 is a front view of the device 900, in accordance with some embodiments.

FIG. 10 is a front view of the device 900, in accordance with some embodiments.

Although the present disclosure has been explained in relation to its preferred embodiment, it is to be understood that many other possible modifications and variations can be made without departing from the spirit and scope of the disclosure.

What is claimed is:

1. A system for facilitating attack-resilient communications between devices, wherein the system comprises a master system comprising:
  a master network switch comprising a plurality of master ports; and
  a plurality of master encryption retransmission devices connected with the master network switch through the plurality of master ports, wherein each of the plurality of master encryption retransmission devices associated with each of the plurality of master ports comprises at least one master encryption unit and a master communication unit communicatively coupled with the at least one master encryption unit, wherein the master system is configurable for connecting with at least one slave system, wherein each of the at least one slave system comprises a slave network switch and a plurality of slave encryption retransmission devices connected with the slave network switch using a plurality of slave ports of the slave network switch, wherein each of a managing master encryption retransmission device of the plurality of master encryption retransmission devices associated with a managing master port of the plurality of master ports and a managing slave encryption retransmission device of the plurality of slave encryption retransmission devices associated with a slave managing port of the plurality of slave ports is configured for receiving a managing packet, wherein each of the master network switch and the slave network switch is configured for:
identifying a first master encryption retransmission device of the plurality of master encryption retransmission devices and a first slave encryption retransmission device of the plurality of slave encryption retransmission devices based on the managing packet; and
enabling an attack-resilient communication between a first device connected with a first master communication unit of the first master encryption retransmission device via a first external encryption retransmission device and a second device connected with a first slave communication unit of the first slave encryption retransmission device via a second external encryption retransmission device.

2. The system of claim 1, wherein the connecting of the master system with the at least one slave system comprises communicatively coupling a second master communication unit of a second master encryption retransmission device of the plurality of master encryption retransmission devices with a second slave communication unit of a second slave encryption retransmission device of the plurality of slave encryption retransmission devices.

3. The system of claim 2, wherein the first master communication unit is configured for:
receiving a first ingressing packet comprising an encrypted ingressing native packet and a complex header from the first external encryption retransmission device;
removing the complex header from the first ingressing packet; and
adding a connectionless header to the first ingressing packet for forming an ingressing connectionless datagram comprising the encrypted ingressing native packet, wherein at least one first master encryption unit of the first master encryption retransmission device is configured for decrypting the encrypted ingressing native packet of the ingressing connectionless datagram using at least one encryption key to obtain a primary egressing native packet, wherein the enabling of the attack-resilient communication comprises routing the primary egressing native packet to at least one second master encryption unit of the second master encryption retransmission device by the master network switch, wherein the at least one second master encryption unit is configured for:
encrypting the primary egressing native packet to create a primary encrypted egressing native packet; and
adding the connectionless header to the primary encrypted egressing native packet to form a primary egressing connectionless datagram, wherein the second master communication unit is configured for adding the complex header to the primary egressing connectionless datagram for forming a primary egressing packet for delivery to the second slave communication unit, wherein the second slave communication unit is configured for:
receiving the primary egressing packet as a primary ingressing packet, wherein the primary ingressing packet comprises a primary encrypted ingressing native packet corresponding to the primary encrypted egressing native packet and the complex header;
removing the complex header from the primary ingressing packet; and
adding the connectionless header to the primary ingressing packet for forming a primary ingressing connectionless datagram, wherein at least one second slave encryption unit of the second slave encryption retransmission device is configured for:
receiving the primary ingressing connectionless datagram comprising the primary ingressive encrypted native packet; and
decrypting the primary ingressing native packet using the at least one encryption key to obtain an egressing native packet, wherein the enabling of the attack-resilient communication further comprises routing the egressing native packet to at least one first slave encryption unit of the first slave encryption retransmission device by the slave network switch, wherein the at least one first slave encryption unit is configured for:
encrypting the egressing native packet using the at least one encryption key to create an encrypted egressing native packet; and
adding a connectionless header to the encrypted egressing native packet to form an egressing connectionless datagram, wherein the first slave communication unit is configured for:
receiving the egressing connectionless datagram; and
adding the complex header to the egressing connectionless datagram for forming a first egressing packet for delivering the first egressing packet to the second external encryption retransmission device.

4. The system of claim 3, wherein the first slave communication unit is configured for:
receiving a second ingressing packet comprising an encrypted ingressing native packet and a complex header from the second external encryption retransmission device;
removing a complex header from the second ingressing packet; and
adding a connectionless header to the second ingressing packet for forming an ingressing connectionless datagram comprising the encrypted ingressing native packet, wherein the at least one first slave encryption unit is configured for decrypting the encrypted ingressing native packet of the ingressing connectionless datagram using at least one encryption key to obtain a primary egressing native packet, wherein the enabling of the attack-resilient communication comprises routing the primary egressing native packet to the at least one second slave encryption unit by the slave network switch, wherein the at least one second slave encryption unit is configured for:
encrypting the primary egressing native packet to create a primary encrypted egressing native packet; and
adding the connectionless header to the primary encrypted egressing native packet to form a primary egressing connectionless datagram, wherein the second slave communication unit is configured for adding the complex header to the primary egressing connectionless datagram for forming a primary egressing packet for delivery to the second master communication unit, wherein the second master communication unit is configured for:
receiving the primary egressing packet as a primary ingressing packet, wherein the primary ingressing packet comprises a primary encrypted ingressing native packet corresponding to the primary encrypted egressing native packet and the complex header;
removing the complex header from the primary ingressing packet; and
adding the connectionless header to the primary ingressing packet for forming a primary ingressing connectionless datagram, wherein the at least one second master encryption unit is configured for:
receiving the primary ingressing connectionless datagram comprising the primary ingressive encrypted native packet; and
decrypting the primary ingressing native packet using the at least one encryption key to obtain an egressing native packet, wherein the enabling of the attack-resilient communication further comprises routing the egressing native packet to the at least one first master encryption unit by the master network switch, wherein the at least one first master encryption unit is configured for:
encrypting the egressing native packet using the at least one encryption key to create an encrypted egressing native packet; and
adding a connectionless header to the encrypted egressing native packet to form an egressing connectionless datagram, wherein the first master communication unit is configured for:
receiving the egressing connectionless datagram; and
adding the complex header to the egressing connectionless datagram for forming a second egressing packet for delivering the second egressing packet to the first external encryption retransmission device.

5. The system of claim 4, wherein the first external encryption retransmission device is associated with a first external address and the second external encryption retransmission device is associated with a second external address, wherein the master communication unit of each of the plurality of master encryption retransmission devices is associated with a master communication unit address and the slave communication unit of each of the plurality of slave encryption retransmission devices is associated with a slave communication unit address, wherein the managing packet comprises an address map comprising the first external address, the second external address, the master communication unit address, and the slave communication unit address.

6. The system of claim 5, wherein the second master communication unit is configured for adding a security wrapper to the primary egressing packet deliverable to the second slave communication unit based on the second external address, wherein the second slave communication unit is configured for unwrapping the security wrapper to reveal the second external address, wherein the slave network switch is configured for identifying the first slave communication unit associated with the second external encryption retransmission device using the second external address and the address map, wherein the routing of the egressing native packet to the at least one first slave encryption unit of the first slave encryption retransmission by the slave network switch is further based on the identifying of the first slave communication unit associated with the second external encryption retransmission device.

7. The system of claim 6, wherein the second slave communication unit is configured for adding a security wrapper to the primary egressing packet deliverable to the second master communication unit based on the first external address, wherein the second master communication unit is configured for unwrapping the security wrapper to reveal the first external address, wherein the master network switch is configured for identifying the first master communication unit associated with the first external encryption retransmission device using the first external address and the address map, wherein the routing of the egressing native packet to the at least one first master encryption unit by the master network switch is further based on the identifying of the first master communication unit associated with the first external encryption retransmission device.

8. The system of claim 1, wherein the first master communication unit is communicatively paired with a first external communication unit of the first external encryption retransmission device, wherein the first slave communication unit is communicatively paired with a second external communication unit of the second external encryption retransmission device.

9. The system of claim 1, wherein at least one of the at least one master encryption unit and at least one slave encryption unit of the at least one slave system comprises two encryption units, wherein the two encryption units are communicatively coupled.

10. The system of claim 1, wherein the managing master encryption retransmission device comprises at least one managing master encryption unit and a managing master communication unit, wherein the managing slave encryption retransmission device comprises at least one managing slave encryption unit and a managing slave communication unit, wherein each of the at least one managing master encryption unit and the at least one managing slave encryption unit comprises an encryption unit and a field-programmable gate array (FPGA) communicatively coupled with the encryption unit.

11. The system of claim 1, wherein the at least one master encryption unit is communicatively coupled to the master communication unit via a one-way connection for providing at least one instruction to the master communication unit.

12. The system of claim 1 further comprising at least one anomaly detector communicatively coupled with at least one of the plurality of master encryption retransmission devices and the plurality of slave encryption retransmission devices, wherein the at least one anomaly detector is configured for:
analyzing at least one signal associated with at least one of the plurality of master encryption retransmission devices and the plurality of slave encryption retransmission devices using at least one machine learning model;
determining an attack associated with at least one of the plurality of master encryption retransmission devices and the plurality of slave encryption retransmission devices based on the analyzing; and
generating an alert for the attack based on the determining of the attack.

13. A system for facilitating attack-resilient communications between devices, the system comprising:
a master system comprising:
a master network switch comprising a plurality of master ports; and
a plurality of master encryption retransmission devices connected with the master network switch through the plurality of master ports, wherein each of the plurality of master encryption retransmission devices associated with each of the plurality of master ports comprises at least one master encryption unit and a master communication unit communicatively coupled with the at least one master encryption unit; and
at least one slave system comprising a slave network switch and a plurality of slave encryption retransmission devices connected with the slave network switch using a plurality of slave ports of the slave network switch, wherein the master system is configured to be connected with the at least one slave system, wherein the connecting of the master system with the at least one slave system comprises communicatively coupling a second master communication unit of a second master encryption retransmission device of the plurality of master encryption retransmission devices with a second slave communication unit of a second slave encryption retransmission device of the plurality of slave encryption retransmission devices, wherein each of the at least one slave system comprises a slave network switch and a plurality of slave encryption retransmission devices connected with the slave network switch using a plurality of slave ports of the slave network switch, wherein each of a managing master encryption retransmission device of the plurality of master encryption retransmission devices associated with a managing master port of the plurality of master ports and a managing slave encryption retransmission device of the plurality of slave encryption retransmission devices associated with a slave managing port of the plurality of slave ports is configured for receiving a managing packet, wherein each of the master network switch and the slave network switch is configured for:
identifying a first master encryption retransmission device of the plurality of master encryption retransmission devices and a first slave encryption retransmission device of the plurality of slave encryption retransmission devices based on the managing packet; and
enabling an attack-resilient communication between a first device connected with a first master communication unit of the first master encryption retransmission device via a first external encryption retransmission device and a second device connected with a first slave communication unit of the first slave encryption retransmission device via a second external encryption retransmission device.

14. The system of claim 13, wherein the first master communication unit is configured for:
receiving a first ingressing packet comprising an encrypted ingressing native packet and a complex header from the first external encryption retransmission device;
removing the complex header from the first ingressing packet; and
adding a connectionless header to the first ingressing packet for forming an ingressing connectionless datagram comprising the encrypted ingressing native packet, wherein at least one first master encryption unit of the first master encryption retransmission device is configured for decrypting the encrypted ingressing native packet of the ingressing connectionless datagram using at least one encryption key to obtain a primary egressing native packet, wherein the enabling of the attack-resilient communication comprises routing the primary egressing native packet to at least one second master encryption unit of the second master encryption retransmission device by the master network switch, wherein the at least one second master encryption unit is configured for:
encrypting the primary egressing native packet to create a primary encrypted egressing native packet; and
adding the connectionless header to the primary encrypted egressing native packet to form a primary egressing connectionless datagram, wherein the second master communication unit is configured for adding the complex header to the primary egressing connectionless datagram for forming a primary egressing packet for delivery to the second slave communication unit, wherein the second slave communication unit is configured for:
receiving the primary egressing packet as a primary ingressing packet, wherein the primary ingressing packet comprises a primary encrypted ingressing native packet corresponding to the primary encrypted egressing native packet and the complex header;
removing the complex header from the primary ingressing packet; and
adding the connectionless header to the primary ingressing packet for forming a primary ingressing connectionless datagram, wherein at least one second slave encryption unit of the second slave encryption retransmission device is configured for:
receiving the primary ingressing connectionless datagram comprising the primary ingressive encrypted native packet; and
decrypting the primary ingressing native packet using the at least one encryption key to obtain an egressing native packet, wherein the enabling of the attack-resilient communication further comprises routing the egressing native packet to at least one first slave encryption unit of the first slave encryption retransmission device by the slave network switch, wherein the at least one first slave encryption unit is configured for:
encrypting the egressing native packet using the at least one encryption key to create an encrypted egressing native packet; and
adding a connectionless header to the encrypted egressing native packet to form an egressing connectionless datagram, wherein the first slave communication unit is configured for:
receiving the egressing connectionless datagram; and
adding the complex header to the egressing connectionless datagram for forming a first egressing packet for delivering the first egressing packet to the second external encryption retransmission device.

15. The system of claim 14, wherein the first slave communication unit is configured for:
receiving a second ingressing packet comprising an encrypted ingressing native packet and a complex header from the second external encryption retransmission device;
removing a complex header from the second ingressing packet; and
adding a connectionless header to the second ingressing packet for forming an ingressing connectionless datagram comprising the encrypted ingressing native packet, wherein the at least one first slave encryption unit is configured for decrypting the encrypted ingressing native packet of the ingressing connectionless datagram using at least one encryption key to obtain a primary egressing native packet, wherein the enabling of the attack-resilient communication comprises routing the primary egressing native packet to the at least one second slave encryption unit by the slave network switch, wherein the at least one second slave encryption unit is configured for:
encrypting the primary egressing native packet to create a primary encrypted egressing native packet; and
adding the connectionless header to the primary encrypted egressing native packet to form a primary egressing connectionless datagram, wherein the second slave communication unit is configured for adding the complex header to the primary egressing connectionless datagram for forming a primary egressing packet for delivery to the second master communication unit, wherein the second master communication unit is configured for:
receiving the primary egressing packet as a primary ingressing packet, wherein the primary ingressing packet comprises a primary encrypted ingressing native packet corresponding to the primary encrypted egressing native packet and the complex header;
removing the complex header from the primary ingressing packet; and
adding the connectionless header to the primary ingressing packet for forming a primary ingressing connectionless datagram, wherein the at least one second master encryption unit is configured for:
receiving the primary ingressing connectionless datagram comprising the primary ingressive encrypted native packet; and
decrypting the primary ingressing native packet using the at least one encryption key to obtain an egressing native packet, wherein the enabling of the attack-resilient communication further comprises routing the egressing native packet to the at least one first master encryption unit by the master network switch, wherein the at least one first master encryption unit is configured for:
encrypting the egressing native packet using the at least one encryption key to create an encrypted egressing native packet; and
adding a connectionless header to the encrypted egressing native packet to form an egressing connectionless datagram, wherein the first master communication unit is configured for:
receiving the egressing connectionless datagram; and
adding the complex header to the egressing connectionless datagram for forming a second egressing packet for delivering the second egressing packet to the first external encryption retransmission device.

16. The system of claim 15, wherein the first external encryption retransmission device is associated with a first external address and the second external encryption retransmission device is associated with a second external address, wherein the master communication unit of each of the plurality of master encryption retransmission devices is associated with a master communication unit address and the slave communication unit of each of the plurality of slave encryption retransmission devices is associated with a slave communication unit address, wherein the managing packet comprises an address map comprising the first external address, the second external address, the master communication unit address, and the slave communication unit address.

17. The system of claim 16, wherein the second master communication unit is configured for adding a security wrapper to the primary egressing packet deliverable to the second slave communication unit based on the second external address, wherein the second slave communication unit is configured for unwrapping the security wrapper to reveal the second external address, wherein the slave network switch is configured for identifying the first slave communication unit associated with the second external encryption retransmission device using the second external address and the address map, wherein the routing of the egressing native packet to the at least one first slave encryption unit of the first slave encryption retransmission by the slave network switch is further based on the identifying of the first slave communication unit associated with the second external encryption retransmission device.

18. The system of claim 17, wherein the second slave communication unit is configured for adding a security wrapper to the primary egressing packet deliverable to the second master communication unit based on the first external address, wherein the second master communication unit is configured for unwrapping the security wrapper to reveal the first external address, wherein the master network switch is configured for identifying the first master communication unit associated with the first external encryption retransmission device using the first external address and the address map, wherein the routing of the egressing native packet to the at least one first master encryption unit by the master network switch is further based on the identifying of the first master communication unit associated with the first external encryption retransmission device.

19. The system of claim 13, wherein the first master communication unit is communicatively paired with a first external communication unit of the first external encryption retransmission device, wherein the first slave communication unit is communicatively paired with a second external communication unit of the second external encryption retransmission device.

20. The system of claim 13, wherein the at least one master encryption unit is communicatively coupled to the master communication unit via a one-way connection for providing at least one instruction to the master communication unit.

* * * * *